United States Patent
Barraclough et al.

(10) Patent No.: US 9,400,875 B1
(45) Date of Patent: Jul. 26, 2016

(54) CONTENT ROUTING WITH RIGHTS MANAGEMENT

(75) Inventors: Keith Barraclough, Mountain View, CA (US); David Irvine, San Jose, CA (US)

(73) Assignee: Nokia Corporation, Espoo (FI)

( * ) Notice: Subject to any disclaimer, the term of this patent is extended or adjusted under 35 U.S.C. 154(b) by 921 days.

(21) Appl. No.: 11/835,061

(22) Filed: Aug. 7, 2007

Related U.S. Application Data

(63) Continuation-in-part of application No. 11/056,345, filed on Feb. 11, 2005, now abandoned.

(60) Provisional application No. 60/837,015, filed on Aug. 11, 2006.

(51) Int. Cl.
*G06F 21/00* (2013.01)
*G06F 21/10* (2013.01)
*G06Q 30/06* (2012.01)

(52) U.S. Cl.
CPC ............... *G06F 21/10* (2013.01); *G06Q 30/06* (2013.01)

(58) Field of Classification Search
USPC .................................. 709/229; 726/4; 705/51
See application file for complete search history.

(56) References Cited

U.S. PATENT DOCUMENTS

| | | | |
|---|---|---|---|
| 4,979,118 A | 12/1990 | Kheradpir | |
| 5,774,660 A | 6/1998 | Brendel et al. | |
| 5,862,325 A | 1/1999 | Reed et al. | |
| 5,920,701 A | 7/1999 | Miller et al. | |
| 5,991,810 A | 11/1999 | Shapiro et al. | |
| 5,996,022 A | 11/1999 | Krueger et al. | |
| 6,006,264 A | 12/1999 | Colby et al. | |
| 6,032,227 A | 2/2000 | Shaheen et al. | |
| 6,052,718 A | 4/2000 | Gifford | |
| 6,065,046 A | 5/2000 | Feinberg et al. | |
| 6,067,565 A | 5/2000 | Horvitz | |
| 6,112,225 A | 8/2000 | Kraft et al. | |
| 6,161,133 A | 12/2000 | Kikinis | |
| 6,167,438 A | 12/2000 | Yates et al. | |

(Continued)

FOREIGN PATENT DOCUMENTS

| | | |
|---|---|---|
| EP | 1 376 398 A2 | 1/2004 |
| JP | 2002-132455 A | 5/2002 |

(Continued)

OTHER PUBLICATIONS

Supplementary European Search Report, PCT/US2007068985, Dec. 15, 2009, pp. 1-9.

(Continued)

*Primary Examiner* — Kyung H Shin
(74) *Attorney, Agent, or Firm* — Ditthavong & Steiner, P.C.

(57) ABSTRACT

The transfer of protected content from a content source to a remote packet-based device is effected. According to an example embodiment of the present invention, a network-based server implements a routing application at a user's content or content source to respond to content requests from remote packet-based devices to facilitate the transfer of protected content. The content is transferred in accordance with applicable rights associated with the content. In some instances, the content is transferred in a protected format; in other instances, the content is transferred in a re-protected format; and in other instances, the content is not transferred as requested, where rights associated with the content prohibit or otherwise restrict the transfer.

13 Claims, 6 Drawing Sheets

(56) References Cited

U.S. PATENT DOCUMENTS

| | | | |
|---|---|---|---|
| 6,170,013 B1 | 1/2001 | Murata |
| 6,240,453 B1 | 5/2001 | Chang et al. |
| 6,298,373 B1 | 10/2001 | Burns et al. |
| 6,304,909 B1 | 10/2001 | Mullaly et al. |
| 6,304,913 B1 | 10/2001 | Rune |
| 6,308,209 B1 | 10/2001 | Lecheler |
| 6,308,222 B1 | 10/2001 | Krueger et al. |
| 6,360,333 B1 | 3/2002 | Jansen et al. |
| 6,407,680 B1 | 6/2002 | Lai et al. |
| 6,470,189 B1 | 10/2002 | Hill et al. |
| 6,473,404 B1 | 10/2002 | Kaplan et al. |
| 6,490,625 B1 | 12/2002 | Islam et al. |
| 6,493,758 B1 | 12/2002 | McLain |
| 6,496,980 B1 | 12/2002 | Tillman et al. |
| 6,505,160 B1 | 1/2003 | Levy et al. |
| 6,516,192 B1 | 2/2003 | Spaur et al. |
| 6,577,601 B1 | 6/2003 | Wolpert |
| 6,584,454 B1 | 6/2003 | Hummel, Jr. et al. |
| 6,593,860 B2 | 7/2003 | Lai et al. |
| 6,598,034 B1 | 7/2003 | Kloth |
| 6,678,244 B1 | 1/2004 | Appanna et al. |
| 6,697,333 B1 | 2/2004 | Bawa et al. |
| 6,732,180 B1 | 5/2004 | Hale et al. |
| 6,751,664 B1 | 6/2004 | Kogan et al. |
| 6,772,214 B1 | 8/2004 | McClain et al. |
| 6,801,777 B2 | 10/2004 | Rusch |
| 6,826,597 B1 | 11/2004 | Lonnroth et al. |
| 6,850,980 B1 | 2/2005 | Gourlay |
| 6,871,236 B2* | 3/2005 | Fishman et al. ............. 709/246 |
| 6,888,477 B2 | 5/2005 | Lai et al. |
| 6,915,328 B2 | 7/2005 | Turnbull |
| 6,920,637 B2 | 7/2005 | Mason et al. |
| 6,937,168 B2 | 8/2005 | Rao et al. |
| 6,976,090 B2 | 12/2005 | Ben-Shaul et al. |
| 6,993,508 B1* | 1/2006 | Major .................... G06F 21/10 380/211 |
| 6,996,720 B1* | 2/2006 | DeMello et al. ............. 713/189 |
| 7,010,500 B2 | 3/2006 | Aarnio |
| 7,035,828 B2 | 4/2006 | Ketonen et al. |
| 7,075,919 B1 | 7/2006 | Wendt et al. |
| 7,120,702 B2 | 10/2006 | Huang et al. |
| 7,133,925 B2 | 11/2006 | Mukherjee et al. |
| 7,139,834 B1 | 11/2006 | Albanese et al. |
| 7,200,680 B2 | 4/2007 | Evans et al. |
| 7,222,292 B2 | 5/2007 | Ali et al. |
| 7,237,029 B2 | 6/2007 | Hino et al. |
| 7,254,602 B1 | 8/2007 | Boivie |
| 7,287,214 B1 | 10/2007 | Jenkins et al. |
| 7,293,115 B2 | 11/2007 | DaCosta et al. |
| 7,299,362 B2* | 11/2007 | Shen et al. .................... 713/189 |
| 7,340,500 B2 | 3/2008 | Traversat et al. |
| 7,356,615 B2 | 4/2008 | Cai et al. |
| 7,483,958 B1 | 1/2009 | Elabbady et al. |
| 7,502,819 B2 | 3/2009 | Alonso |
| 7,805,315 B2 | 9/2010 | Goel |
| 7,827,312 B2 | 11/2010 | Ramaswamy et al. |
| 7,895,445 B1 | 2/2011 | Albanese et al. |
| 7,917,628 B2 | 3/2011 | Hesselink et al. |
| 7,961,645 B2 | 6/2011 | Gudipudi et al. |
| 8,042,163 B1 | 10/2011 | Karr et al. |
| 2001/0011349 A1 | 8/2001 | Garrison |
| 2001/0047400 A1 | 11/2001 | Coates et al. |
| 2002/0007404 A1 | 1/2002 | Vange et al. |
| 2002/0016922 A1 | 2/2002 | Richards et al. |
| 2002/0026491 A1 | 2/2002 | Mason et al. |
| 2002/0040389 A1 | 4/2002 | Gerba et al. |
| 2002/0052798 A1 | 5/2002 | Nishikado et al. |
| 2002/0052855 A1 | 5/2002 | Landesmann |
| 2002/0052885 A1 | 5/2002 | Levy |
| 2002/0056004 A1 | 5/2002 | Smith et al. |
| 2002/0073057 A1 | 6/2002 | Benoit et al. |
| 2002/0077984 A1* | 6/2002 | Ireton .................... G06F 21/10 705/51 |
| 2002/0083342 A1 | 6/2002 | Webb et al. |
| 2002/0099796 A1 | 7/2002 | Chou |
| 2002/0103934 A1 | 8/2002 | Fishman et al. |
| 2002/0107807 A1 | 8/2002 | Ketonen et al. |
| 2002/0120574 A1* | 8/2002 | Ezaki .................... G06Q 30/06 705/51 |
| 2002/0120607 A1 | 8/2002 | Price et al. |
| 2002/0124098 A1 | 9/2002 | Shaw |
| 2002/0133570 A1 | 9/2002 | Michel |
| 2002/0133626 A1 | 9/2002 | Turnbull |
| 2002/0161835 A1* | 10/2002 | Ball et al. ..................... 709/203 |
| 2002/0174246 A1 | 11/2002 | Tanay et al. |
| 2002/0194324 A1 | 12/2002 | Guha |
| 2003/0046401 A1 | 3/2003 | Abbott et al. |
| 2003/0046703 A1 | 3/2003 | Knowles et al. |
| 2003/0061387 A1 | 3/2003 | Brown et al. |
| 2003/0088544 A1 | 5/2003 | Kan et al. |
| 2003/0088686 A1 | 5/2003 | Jennings |
| 2003/0110234 A1 | 6/2003 | Egli et al. |
| 2003/0119386 A1 | 6/2003 | Laux et al. |
| 2003/0172186 A1 | 9/2003 | Dunn et al. |
| 2003/0177269 A1 | 9/2003 | Robinson et al. |
| 2003/0194998 A1 | 10/2003 | Bhide |
| 2003/0200337 A1 | 10/2003 | Jabri et al. |
| 2003/0204602 A1 | 10/2003 | Hudson et al. |
| 2004/0003132 A1 | 1/2004 | Stanley et al. |
| 2004/0032348 A1 | 2/2004 | Lai et al. |
| 2004/0049462 A1 | 3/2004 | Wang |
| 2004/0117845 A1 | 6/2004 | Karaoguz et al. |
| 2004/0122958 A1 | 6/2004 | Wardrop |
| 2004/0139233 A1 | 7/2004 | Kellerman et al. |
| 2004/0148434 A1 | 7/2004 | Matsubara et al. |
| 2004/0148503 A1 | 7/2004 | Sidman |
| 2004/0181706 A1 | 9/2004 | Chen et al. |
| 2004/0199667 A1 | 10/2004 | Dobbins |
| 2004/0243839 A1* | 12/2004 | Bhatia et al. .................. 713/201 |
| 2004/0250291 A1 | 12/2004 | Rao et al. |
| 2004/0267954 A1 | 12/2004 | Shen |
| 2005/0033850 A1 | 2/2005 | Kirkland |
| 2005/0131871 A1 | 6/2005 | Howard et al. |
| 2005/0132264 A1 | 6/2005 | Joshi et al. |
| 2005/0148319 A1 | 7/2005 | Himeno |
| 2005/0256870 A1 | 11/2005 | Benco et al. |
| 2006/0117018 A1 | 6/2006 | Christiansen et al. |
| 2006/0120385 A1 | 6/2006 | Atchison et al. |
| 2006/0168318 A1 | 7/2006 | Twiss |
| 2006/0173974 A1 | 8/2006 | Tang |
| 2006/0243325 A1 | 10/2006 | Ramaswamy et al. |
| 2007/0159976 A1 | 7/2007 | Dekeyzer et al. |
| 2007/0174471 A1 | 7/2007 | Van Rossum |
| 2007/0288247 A1 | 12/2007 | Mackay |
| 2007/0299681 A1 | 12/2007 | Plastina et al. |
| 2008/0049642 A1 | 2/2008 | Gudipudi et al. |
| 2008/0052415 A1 | 2/2008 | Kellerman et al. |
| 2008/0060038 A1 | 3/2008 | Stallings et al. |

FOREIGN PATENT DOCUMENTS

| | | |
|---|---|---|
| JP | 2002-351729 A | 12/2002 |
| WO | WO 01/03373 A1 | 1/2001 |

OTHER PUBLICATIONS

Office action for related U.S. Appl. No. 11/435,357 dated Jul. 29, 2010, pp. 1-24.

Office action for related U.S. Appl. No. 11/219,529 dated Oct. 7, 2010, pp. 1-29.

Office action for related U.S. Appl. No. 11/051,458 dated Mar. 8, 2011, pp. 1-41.

Final Office Action for related U.S. Appl. No. 11/051,458, Aug. 18, 2011, pp. 1-18.

Office Action for related U.S. Appl. No. 11/219,529, Jun. 8, 2011, pp. 1-32.

Office Action for related U.S. Appl. No. 11/374,409, Jun. 8, 2011, pp. 1-31.

Office Action for related U.S. Appl. No. 11/408,140, Jul. 13, 2011, pp. 1-33.

Office Action for related U.S. Appl. No. 11/700,345, Jun. 10, 2011, pp. 1-51.

(56) References Cited

OTHER PUBLICATIONS

Russian Office action for corresponding RU application No. 2008149517/08(064991) dated May 20, 2011, pp. 1-11.
Office Action for Japanese Application No. 2009-511211 dated Oct. 4, 2011, pp. 1-5.
Office Action for U.S. Appl. No. 11/374,409 dated Oct. 28, 2011, pp. 1-19.
Office Action for U.S. Appl. No. 11/700,345 dated Nov. 18, 2011, pp. 1-39.
BackWeb Foundation 5.5 Technical White Paper, Nov. 1999, pp. 1-49.
Chinese Office action for correspondiong CN app. No. 200680041085.1 dated Jul. 9, 2010, pp. 1-22.
Chinese Office action for correspondiong CN app. No. 200680041085.1 dated Jul. 17, 2009, pp. 1-21.
GPS to do wonders for wireless browsing, Hammer, May 25, 2000, pp. 1-3.
Office Action for related U.S. Appl. No. 11/408,140, dated Aug. 3, 2012, pp. 1-23.
European Office action for corresponding EP application No. 06718618.9-2413 dated Jan. 21, 2011, 1 page.
European Office action for corresponding EP application No. 06801968.6-2413 dated Feb. 1, 2011, 1 page.
Extended European search report for corresponding EP application No. 06718618.9-2413 dated Jan. 4, 2011, pp. 1-9.
Extended European search report for corresponding EP application No. 06801968.6-2413 dated Jan. 14, 2011, pp. 1-10.
International preliminary report on patentability for corresponding international application No. PCT/US06/32543 dated Jan. 3, 2008, pp. 1-5.
International search report and written opinion for corresponding international application No. PCT/US06/01565 dated Jun. 16, 2006, pp. 1-4.
International search report and written opinion for corresponding international application No. PCT/US06/32543 dated Jun. 5, 2007, pp. 1-7.
Server-directed transcoding, Mogul, J. C., Computer Communications 24, 2001, Elsevier, pp. 155-162.
Final Rejection for related U.S. Appl. No. 11/700,345 dated May 17, 2012, pp. 1-38.
Office Action for related European Application No. 07 797 483.0 dated May 3, 2012, pp. 1-5.
Office Action for related U.S. Appl. No. 11/435,344 dated May 3, 2012, pp. 1-23.
Final Rejection for related U.S. Appl. No. 11/435,344 dated Oct. 26, 2012, pp. 1-25.
Office Action for related U.S. Appl. No. 11/056,345 dated Dec. 10, 2012, pp. 1-52.
May 25, 2000, Ben Hammer, "GPS to do wonders for wireless browsing" posted on the world wide web.
Nov. 1999, "BackWeb® Foundation 5.5 Technical White Paper".
Johnston et al., "Real-Time Digital Libraries Based on Widely Distributed, High Performance Management of Large-Data-Objects", Preprint—International Journal of Digital Libraries, Special Issue on "Digital Libraries in Medicine", vol. 1 Issue 3, Dec. 1997, 18 Pages.

\* cited by examiner

CONTENT ROUTING WITH RIGHTS MANAGEMENT

RELATED PATENT DOCUMENTS

This patent document claims the benefit, under 35 U.S.C. §119(e), of U.S. Provisional Patent Application Ser. No. 60/837,015 filed on Aug. 11, 2006 and entitled: "Content Routing with Rights Management"; this patent document is also a continuation-in-part, under 35 U.S.C. §120, of U.S. patent application Ser. No. 11/056,345 entitled "Network-distributed Content Routing," filed Feb. 11, 2005 now abandoned, to which priority is claimed; these documents are fully incorporated herein by reference.

FIELD OF THE INVENTION

The present invention relates generally to content communications between remotely-situated packet-based devices and, more particularly, to the routing of protected content from a personal content source to remote devices via a packet-based network.

BACKGROUND OF THE INVENTION

As access to packet-based networks such as mobile telephone networks, the Internet and other communications networks becomes easier, convenient and more readily available, these networks are increasingly used for applications involving the transfer of content such as images, audio, video and other types of streaming content, text and other content. For example, content for computer software, music, video, news services, games and other applications is being requested and delivered via the Internet and, for many applications, via wireless networks such as those implemented for cellular telephone networks.

Content (e.g., audio, images or video) has evolved in application and is readily stored electronically. For example, the storage of music in rewritable electronic media has become a popular method in which to maintain and access music collections. Another example involves video applications, where digital recording and storage of television and personal video collections has become popular. Photos are often stored and accessed electronically, instead of relying upon conventional printed photos and physical photo albums.

As the electronic storage of content and other content grows in popularity, access to the content as well as convenient manners in which to store and protect the content and become increasingly important. For example, sales of music in downloadable audio formats are becoming increasingly popular. Digital audio players based in the home or office or mobile players that can be used in autos, laptop computers, personal listening devices and others are used for playback of this downloaded music. In order to play the music, audio content is loaded onto mobile players or local computers and used to locally play the music. The amount of storage space required for storing a large volume of audio content can exceed the memory capacity of digital audio players, computers or other appliances capable of playing music. In this regard, the management and use of audio, as well as other content such as image content and video content, has become increasingly burdensome in view of the demand for and use of this content, and in particular as rights associated with content are to be maintained.

As applied to conventional documents and other types of content (e.g., text-based documents, spreadsheets or presentations), the demand for flexible and efficient access to such content has also grown. For example, many workplaces have become increasingly mobile; employees are often working from a remote location such as at home or at traveling locations. Access to content from remote locations has been particularly useful for facilitating mobility while maintaining a desirable level of access to information. However, the growing size of content files desirably transferred to facilitate mobility or to otherwise provide flexible content access has presented challenges to the delivery of such content over communications channels. For instance, email is generally limited in its ability to transfer large content files, such as audio, video, text and presentation files.

For many communication applications, the increase in use and lack of availability of content transfer approaches requires the creative use of communications channels and content. To meet these and other content transfer needs, networks have been enhanced both in the ability to process larger quantities of content and in the ability to process content at a higher rate of speed. In addition, packet-based devices have been improved to increase the speed at which content can be processed and transferred. However, as the demand for high quantity content transfer increases, these needs become more difficult to meet.

One challenge to content transfer on the Internet stems from the inflexibility of content transfer channels. For example, if a content supplier sells content to an end user via the Internet, the end user typically downloads the content using one of only a handful of download locations operated at the control of the supplier. This type of operation can be cumbersome and expensive because the content may have to travel a significant distance and thus take up more time and space in the communications network. In addition, the transfer of content is limited by the location of the download locations.

Another challenge to the effective transfer and management of content is related to the provision of content at an acceptable transfer rate (e.g., as related to bandwidth). Certain packet-based devices are limited in their ability to process audio content at different speeds, either by their internal configurations or by the availability of network access. For instance, mobile (wireless) type packet-based devices can be limited by the available connectivity to mobile networks. In addition, certain devices may be implemented for wired and wireless communications, with their respective ability to access content being relatively higher (e.g., faster) via wired communications, relative to wireless; when these appliances are operating via wireless communications, they may be able to receive content at a lower speed, or bitrate.

Yet another challenge to content transfer and management stems from the existence of a myriad of different types of content, different types of content protection, as well as different types of content access appliances. For example, a variety of different content types are implemented for storing audio files. Often, these content types are associated with a particular type of digital audio device that is being used for playback. In addition, with each content type, there are often different manners in which the content is stored and/or protected, typically involving different levels of quality (e.g., with different playback bitrates). For instance, a digital audio player must not only have access to content but also have access to content in a particular format and be amenable to use of any protection applied to the content.

As discussed above, one of the particularly challenging aspects of network content transfer involves the protection of the content, which relates to the management of media rights such as those associated with digital rights management (DRM). As discussed above, digital media such as audio or video can be purchased via electronic delivery. In order to inhibit and/or prevent copying, distribution or other unauthorized use of content, security precautions are taken. In some applications, these security precautions require specific approaches to enable playback, which can further exacerbate difficulties associated with content transfer and subsequent use (e.g., playback).

Effectively and efficiently managing content transfer via communication networks has been challenging in the face of the advancement of technologies and trade channels that use or could use network-based content transfer. In addition, the limitations of previous approaches restrict the ability to meet the demand of transferring such content between content terminals in a reliable, secure, efficient and affordable manner.

SUMMARY OF THE INVENTION

The present invention is directed to approaches to content routing, management and associated applications for making application-type content available at a remote device. The present invention is exemplified in a number of implementations and applications, some of which are summarized below.

According to an example embodiment of the present invention, an approach to content routing involves the establishment of a communications approach to routing protected content between a user's registered packet-based device (e.g., at a home or office) and a remote packet-based device authorized via the registered user. The routing of the content is effected in a manner that facilitates the protection of the content.

In connection with another example embodiment of the present invention, a network communication system facilitates access to protected content at different remote packet-based devices in a packet-based network environment, for registered users having rights to protected content. A host server arrangement is communicatively coupled to a network to receive requests for protected content access at a remote packet-based device. The host associates each request with a registered user's content source and authenticates each request as a function of authentication data and the association. For instance, where access to a registered content source requires a password or key, the host may authenticate a request by ensuring that the request includes the password or key required for the associated content source. For each authenticated request, the host controls the delivery of requested content, from a content source to the remote packet-based device via the network. Each associated content source includes a content router that is controllable by the host server for delivering the requested content. Each content router selectively configures the content as a function of a protection characteristic of the content (e.g., to ensure the content is delivered in accordance with appropriate protection characteristics). The content router then sends (e.g., controls the content source to send) the selectively configured content to a remote packet-based device to which routing of the content is requested.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention that follows in connection with the accompanying drawings, in which.

Figure 1:
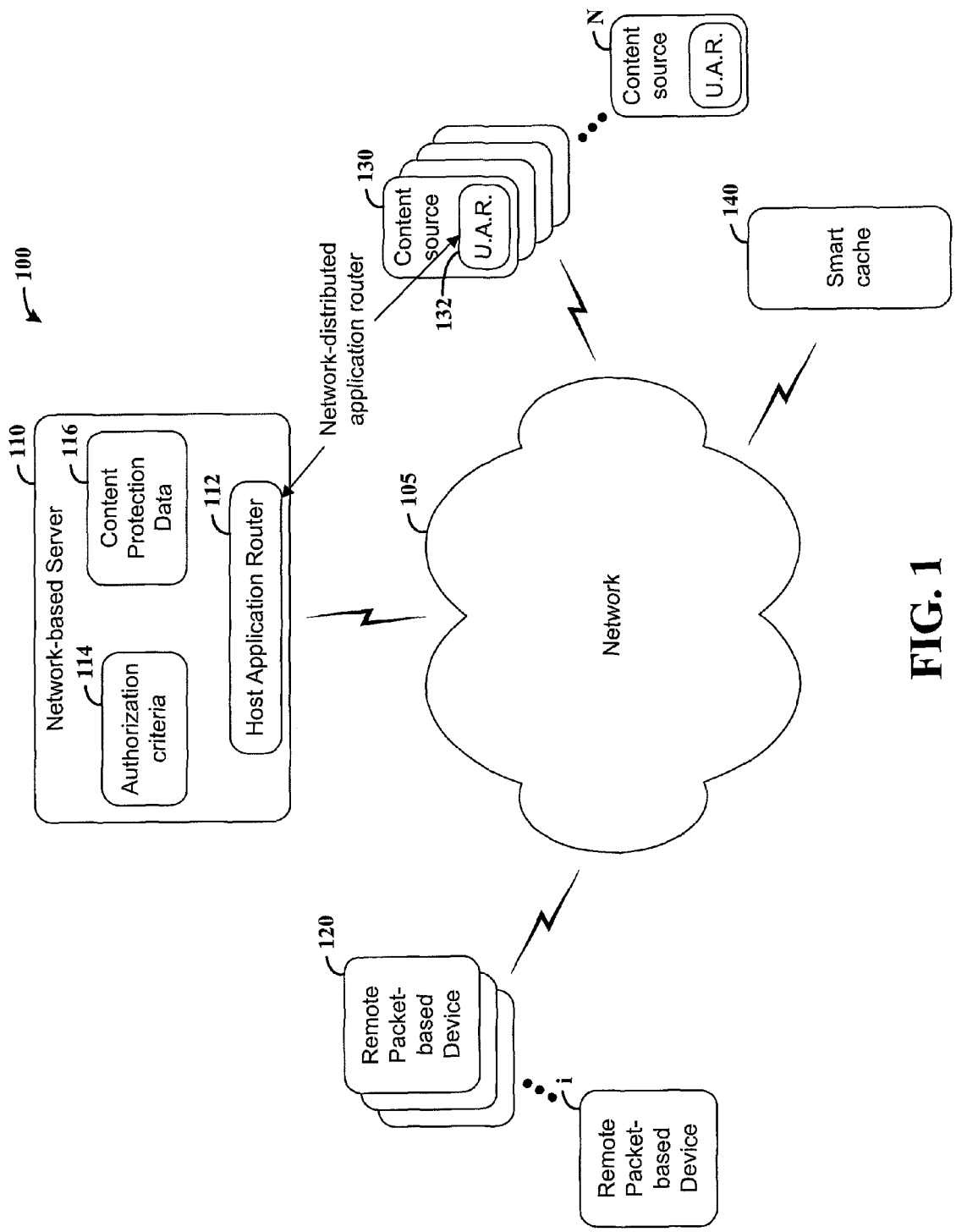
FIG. 1 is a system for routing content via a packet-based network using a server-hosted interface access approach, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention is believed to be applicable to a variety of different types of communications, and the invention has been found to be particularly suited for protected content routing over one or more packet-based networks such as mobile telephone networks, wireless networks and/or the Internet. While the present invention is not necessarily limited to such applications, various aspects of the invention may be appreciated through a discussion of various examples using this context.

According to an example embodiment of the present invention, a peer-to-peer network routing system selectively communicates content such as audio, video or images between a registered data (e.g., content) source and a user at a remote packet-based device. Certain types of the content are protected by rights, such as those often referred to as applicable with digital rights management (DRM) and associated with, for example, copyright or other laws regulating the use and/or distribution of content. In some instances, rights are associated with a desire to protect personal and/or confidential information. Where content is protected by such rights, these rights are protected in the transfer of the content.

The registered data source is generally implemented with a type of packet-based device (i.e., a device that communicates via packets over a packet-based network) or a set of networked devices, such as a personal computer or similar device networked with one or more content-storage devices, with one or more of the devices having access to content. In some applications, the registered data source is a content provider, such as a television or audio content provider. The remote packet-based device is also implemented with a type of device capable of accessing web pages and receiving routed content, such as a mobile telephone, laptop, personal computer, digital audio or video player, an integrated device or one of a multitude of computing devices.

A host server facilitates the routing of the content from a registered data source at the direction of a user who registers with the host server and provides information identifying content to be made accessible via the registered data source. Routing software is implemented at the registered data source, with the host server communicating with and controlling the registered data source via the routing software, using preferences identified by the registered user and, where appropriate, any rights associated with the content to be routed. For instance, registered-user preferences may specify that a particular file or content set be made available for routing while restricting other files or content sets from access. These preferences are followed, to the extent that they do not conflict with any rights associated with the content.

The host server processes requests for content by authorizing the requests and selectively routing the content in a manner that complies with any applicable rights to content that is protected. For instance, where content requested from the registered data source is protected by copyright, broadcast restrictions and/or other types of protection, the host server selectively routes the content in a manner commensurate with such protection. That is, in instances where a registered user allows (e.g., via preferences) the transfer of a particular type of data, such transfer is selectively limited in accordance with applicable rights. In some applications, the host server facilitates the protection of content in connection with software implemented at the content source; in this context, the host server and content source work together to implement network-distributed routing functions.

One example application involving the protection of content relates to the distribution of digital audio content. Where requested content is digital audio that is protected by copyright laws, the host server identifies this protection and either facilitates the routing the protected content in a manner that complies with such laws or denies the routing of the data where routing is impermissible or where protected routing is unavailable. In some applications, one or both of the host server and registered data source are programmed with distribution control programming that ensures that requested digital audio content is usable by the remote packet-based device and, in some instances, protected. In some applications, the digital audio content is delivered to the remote packet-based device in an original protected format, such as that in which digital audio content is delivered (upon purchase) via the Internet.

In certain applications where the remote packet-based device is unable to use the content in its original protected format, the host server ascertains whether alternate protection approaches are acceptable not only for use at the remote packet-based device but also for maintaining protection rights of the content. Where appropriate, the host server removes the original protection and sends the content in an unprotected format. Where protection is necessary or otherwise desirable yet an original protected format is undesirable, original protection is removed from the content and the content is re-protected using a protection scheme usable by the remote packet-based device. Using the example of digital audio content again, a user storing audio at his or her registered data source (e.g., a PC or digital audio player) can access the music via a remote packet-based device such as a mobile telephone. This access is facilitated irregardless of the type of protection associated with the content while maintaining assurance that the music is properly distributed in view of media rights and/or characteristics of the remote packet-based device. In these and other examples herein, the removal of protection and re-protection is selectively carried out via one or both of the host server and the registered data source (the latter using, e.g., software implemented by the host server or otherwise available to the registered data source).

While digital audio content is discussed in the above examples, a variety of content types are applicable to the approaches, as are a variety of protection types. For instance, where requested content is broadcast television and blackout rules apply to certain areas, the host server selectively routes the broadcast television content according to the location of the remote packet-based device and the corresponding blackout rules. In this regard, content protection may be relevant to time, location or other conditions associated with the request. In each instance, the host server works with software at the registered data source to facilitate routing that complies with applicable laws or rules.

Where appropriate, the host server identifies the type of protection afforded to requested content in one or more of a variety of manners. For instance, where requested content is digital audio, the host server may identify rights associated with the digital audio in a manner commensurate with publicly-available approaches, such as those used by PC-based audio players. In certain applications, the host server ascertains the nature of the protection of content directly from the content itself, or from data such as metadata associated with the content at the registered data source. In other applications, the host server ascertains the nature of the protection of content by accessing an Internet-based source depicting appropriate protection information.

In some applications, the host server provides a personal network service that facilitates user access to content available at the registered data source. In connection with this personal network service, the host server provides a web-based interface to the user at the remote packet-based device. This interface characterizes content at the registered data source that is available to the user as specified by a registered user for the registered data source. Where appropriate, the interface also characterizes protection characteristics of the content. User content selections made via the web-based interface at the remote packet-based device are communicated to the host server, which processes the selections by delivering content as appropriate.

Where appropriate, the host server facilitates the delivery of protected content by configuring the content into a format that is amenable to delivery to and/or use at the remote packet-based device. For example, where a remote packet-based device is capable of displaying pictures in a particular format, pictures requested by the remote packet-based device are appropriately formatted so that the remote packet-based device can display the pictures. In addition, where content transfer rate is limited by available connections (bandwidth), pictures may be formatted so that each picture requires a relatively lesser amount of content (e.g., high resolution images are formatted to a lower resolution to reduce image content size, prior to transfer). As another example, when digital audio content is requested and the remote packet-based device is adapted for playing audio content in a particular digital audio format (e.g., mp3 format), requested audio content is formatted into the particular digital audio format. In each of these examples, the host server and/or the registered data source facilitates the removal of protection from protected content, where useful for configuration of the content, and selectively re-protects the content where desirable and/or required. In certain applications, the re-protection is also carried out in a manner amenable to delivery to and/or use at the remote packet-based device.

In some embodiments, the host server implements a configuration approach similar to that discussed above to facilitate access to the content at a particular remote packet-based device without necessarily requiring that the remote packet-based device bear an application specific to the content for access thereto. In some applications, the host server also implements the configuration approach to facilitate access conditions pertaining to protection associated with the content. In this regard, the host server ascertains or otherwise identifies a configuration of requested content that is amenable to use at the remote packet-based device, with any appropriate protection approaches implemented therewith. Such a configuration may, for example, be such that the content is made accessible via a web browser program that may or may not have capabilities for viewing the content without configuration, or otherwise implementing protective characteristics of the data. The host server thus facilitates access to (e.g., viewing, hearing or otherwise accessing) content created with and/or stored in connection with a particular software program and/or type of protection at the registered data source. This access via the remote packet-based device is thus selectively made without necessarily using a particular software program at the remote packet-based device.

In certain applications involving the reconfiguration of an application-specific type of data, selected content at the registered data source is transcoded, such as by placing the content into a MIME type that can be sent over a packet-based network such as the Internet to a remote packet-based device. In this context, a "MIME type" refers to a format that facilitates the transfer of content such as images, graphics files or text over the packet-based network, such that the files can be viewed using an Internet browser application (e.g., without necessarily implementing a software program used to create the content). This transcoding approach is effected at the registered data source, with any appropriate protection-related approaches taken in connection therewith.

In general, application-specific content amenable to use with one or more of the above approaches is content that a user or content provider generally uses an application to create, manage, protect or otherwise process. This content may include, for example, content specific to a particular program application, content protected with a particular protection approach, or a type of content that can be implemented with a variety of program applications. For instance, email messages may be managed by a mail reader application, music may be managed by a music library application or player, and images may be managed by an album application; each of these applications involve content specific to the applications (application-specific content). In each of these applications, protection is afforded to the data to address any protection needs.

Various approaches for delivering content to the remote packet-based device are implemented in connection with different applications, depending upon the conditions surrounding each application and other relevant concerns. In each application, the host server controls the routing of content from the registered data source (and other registered data sources, and at times from two or more sources for a particular request). In one delivery example, software at the registered data source is configured to make the content available to the host server, with the host server retrieving the content from the registered data source and passing the retrieved content to the remote packet-based device. In another delivery example, software at the registered data source makes content available directly to the remote packet-based device at the direction of the host server using, for example, an Internet interface provided by the host server. In still another example, content is made available via a network cache, with the content provided from the cache to the remote packet-based device (e.g., directly or via the host server), with protection facilitated via software at the cache and/or at the host server as discussed herein. Where content is protected in either example, one or both of the host server and the registered data source work to ensure that the delivery of the content is made in accordance with such protection. Where delivery cannot be made in accordance with protection, or where only some of the content can be delivered, the delivery of the content is limited to facilitate the protection.

As discussed above, access to content at each registered data source is controlled by the host server using one or more authorization criteria to limit access to the registered data source and, where appropriate, determine whether content can be made accessible while meeting protection conditions. For example, where requested content is protected, the host server selectively uses such authorization criteria to facilitate the transfer of the protected content. Where content is protected in a manner that restricts its access to a specific user or users, the authorization criteria can be used to identify a recipient of the protected content as such a specific user.

Where user-specific criteria, such as identification (e.g., user name) and security code (e.g., a password) are used for authorization, this information may be stored at a remote packet-based device and automatically provided to the host server, at the host server (or elsewhere on the network) or input by a user at the remote packet-based device. In some applications, identification characteristics specific to each remote packet-based device is used as authorization criterion, with such identification information provided by the remote packet-based devices to the host server. For instance, where the remote packet-based device includes a mobile telephone, the telephone number may be used to grant access to content at the registered data source. Other identifiers can also be used to grant access, such as a user identification number of a mobile phone or the identification of another packet-based device such as a laptop, personal computer, personal data assistant device or digital media player. In other applications, a combination of identification information specific to a remote packet-based device (e.g., a telephone number) and user-specific criteria, such as a password and/or identification, are used in controlling access to content at the registered data source.

In some applications, the host server uses an authorization criterion for a particular content access request to grant specific access to limited portions of content available at the registered data source as a function of protection associated with the content. For example, where certain content at the registered data source is protected in a manner that precludes its delivery to a remote user, while unprotected (or differently-protected) content is available to the remote user, the host server selectively makes the unprotected content available. Where the host server presents an interface to a remote user requesting access, the interface is configured to display the available content.

As described in connection with the above and other various example embodiments and implementations described herein, the registered data source may include, for example, one or more of a personal computer, set top box, web camera, secure monitoring system and/or content storage system at a home or business location with network (e.g., Internet) access. In this context, a "user" at a remote packet-based device may include one or more individuals, such as members of a household, employees of a business entity or simply an individual given access authorization by a user associated with the registered data source. Further, a "user" may be a machine functioning automatically, e.g., as programmed by an individual.

Turning now to the figures, FIG. 1 is a system 100 for routing content via a packet-based network using a server-hosted interface to facilitate the routing in accordance with protection afforded the content, according to another example embodiment of the present invention. The system 100 includes a network-based server 110 that hosts an interface for use in selecting content, and facilitates the routing of the selected content with any appropriate protective approaches implemented. The system 100 further includes a plurality of remote packet-based devices 120-i, such as mobile telephones, personal computers, personal media players or personal data devices. In addition, the system 100 includes a plurality of content sources 130-N, such as a personal computer, business server, mobile Internet appliance or a media provider.

The server 110, remote packet-based devices 120-i and the content sources 130-N all communicate via a network 105, which includes a packet-based network and, where appropriate, one or more other networks such as a mobile telephone network. In some applications, the network 105 is a local area network implemented for a locality such as a home or business. In other applications, the network 105 is or includes a virtual network or set of virtual application communication channels within a processor or group of processors associated with a computing appliance. Protected content is routed on the network 105 in a manner that facilitates compliance with protective approaches for the content.

The network-based server 110 includes a host application router 112 that interacts with user application routers at each content source and hosts an interface presented using, for example, an Internet web page. In this regard, each content source includes at least one appliance bearing the user application router, with content source 130 shown including a user application router 132. The user and host application routers work together to facilitate a network-distributed router, with the user and host application routers communicating to one another to identify content available for transfer and to transfer the content. In certain applications, the user application routers are software-implemented routers that respond to controls from the host application router 112.

In some applications, the user application router 132 is configured at the network-based server 110 and downloaded to content sources as a software download, and implemented on an appliance such as a personal computer or a network router. Each user can thus access his/her content at the user's content source or sources, using his/her personal router and content at the user's content source(s).

Using the interface, the network-based server 110 selectively facilitates user access to content at one or more of the content sources 130-N, with users implementing one of the remote packet-based devices 120-i for the access. The network-based server 110 implements authorization criteria 114 for authenticating a particular user in response to a request for access to content via one of the content sources 130-N and/or one of the remote packet-based devices 120-i. In this regard, when a user at a remote packet-based device requests content such as image, audio and/or video media content from a particular content source, the network-based server 110 processes an authorization for the request by the user using the authorization criteria 114. This authorization may involve, for example, ensuring that a particular user is authorized to access a particular content source and/or to access particular content in accordance with protection of the particular content. If the authorization is successful, the network-based server 110 facilitates the communication of content from one or more of the content sources 130-N to one of the remote packet-based devices 120-i to which the user requested content.

The content communicated to one of the remote packet-based devices 120-i is selectively configured at the direction of the network-based server 110 for use at the remote packet-based device. Where the content is protected, the configuration is selectively made to facilitate the protection. For example, where a particular media file is protected from duplication, that file may be configured in a manner that is accessible yet not duplicable. As another example, where requested content from content source 130 is application-specific content that is implemented using a particular application program, the network-based server 110 selectively controls the configuration of the content. That is, one or both of the host application router 112 and the U.A.R. 132 selectively facilitate the configuration of the data into a format that is usable by a requesting remote packet-based device (e.g., 120).

Where the remote packet-based device 120 has an application program capable of implementing the requested content, the requested content is not necessarily configured into a different format. For instance, such an application program at the remote packet-based device may be capable of displaying or otherwise presenting content to a user and, where appropriate, protecting rights associated with the content.

Where the remote packet-based device is incapable of implementing the requested content, or where transfer of the content in a different format is desirable (e.g., to reduce transfer bandwidth), the requested content is reconfigured into a format such that it can be implemented at the remote packet-based device. For instance, where the requested content requires a particular word processing program and the remote packet-based device is to view the content using a web browser, one or both of the host application router 112 and the U.A.R. 132 work to configure the requested content into a format that can be implemented by a web browser.

The network-based server 110 selectively processes requests for content transfer in accordance with media rights associated with the content. Media (or other content) rights are often the subject of rules, regulations, contracts or other agreements relating to the rights associated with the content. In this regard, these rules, regulations, contracts or other agreements are implemented to ensure that any transfer of the content complies with these agreements. For instance, as discussed above, certain content such as media is protected by copyright or other digital rights management (DRM) protection. Where the transfer of the protected content needs to comply with particular rules or regulations, the network-based server 110 and corresponding content source are configured, via the host application router 112 and the user application router at the corresponding content source, to take steps to ensure the transfer of content is in compliance.

For example, where a user at the remote packet-based device 120 requests the delivery of protected content, the host application router 112 works with the user application router 132 to process and transfer the requested content accordingly. In some applications, this transfer involves simply passing protected content to the remote packet-based device 120, which processes the content with protection for use. In applications where the remote packet-based device 120 cannot process content in a particular protected format or where the passage of protected content is undesirable, the application router configures the content into a protected or unprotected format that can be used by the remote packet-based device.

In some applications, the network-based server 110 blocks access to certain files relative to the type of file and applicable regulations regarding the transfer of the type of file. For example, access to protected media may be blocked to any user other than a user verified as being the owner of the protected media, e.g., where a user at content source 130 makes content available to his or her personal remote packet-based device 120.

In certain implementations, the network-based server 110 tracks the transfer of protected content and, where appropriate, reports irregularities or potential abuses. For instance, where a password for controlling user-specific access to protected media is used by more than one user at a time, or used at a relatively high frequency, the network-based server 110 can detect these uses and flag the use as potentially in violation of relevant media rights. Such an approach addresses the potential of users illegally sharing their information with others. In some implementations, a user's account is automatically shut down, effectively stopping any transfer of content, upon detection of a potential irregularity.

The network-based server 110 uses various approaches to facilitate the protection of content, including approaches directed to the delivery of protected content, the selective delivery of unprotected content (i.e., to an authorized user), the protection of unprotected content. In some implementations, encryption, password protection or forward-blocking approaches (i.e., preventing received content from being re-forwarded) are used to ensure that protected content is transferred in compliance with applicable rules. In certain applications where content is protected but not amenable to use at a remote packet-based device, the network-based server 110 removes protection from the protected content and reapplies a different type of protection that facilitates the maintenance of protection of the content while making the content amenable to use at the remote packet-based device. Approaches to protection and/or re-protection of content may include, for example making content accessible via a web browser or other web software program, while inhibiting the content from being stored or otherwise distributed.

In one embodiment, protection of content is removed at a content source (e.g., 130) and re-protected using an encryption approach. The content source provides a key to the remote packet-based device (e.g., 120) that is to use the re-protected content. The re-protected content is then provided to the remote packet-based device, which uses the provided key to access the protected content.

For certain applications requiring the delivery of content in accordance with particular protection approaches, such as those implemented with relevant communication rules and/or laws, the host and user application routers 112 and 132 use some or all of these approaches to ensure compliance. In some applications, the application router removes the original protection from content and sends the content in an unprotected format to a remote user, where such unprotected delivery is acceptable (e.g., where delivery to a particular user's remote packet-based device is in compliance with applicable rules). In other applications, the application router re-protects the content in a manner such that the content can be processed by the remote packet-based device receiving the content. Still other applications involve the use of a token as discussed further below, with the token including, for example, authorization for a particular user to receive and use content, or application software that facilitates the use of protected content at a remote packet-based device.

In some applications, the configuration of content is implemented using a plug-in at the content source that is adapted to access information tagged to stored content in order to present the content to a remote packet-based device. This tagged information may include, for example, an identification of a protection characteristic of the content and/or an identification of the type of the content. A user at the remote packet-based device can thus make selections for content transfer in accordance with the tagged content (e.g., by requesting a particular category of content or requesting content that is not protected). The plug-in then uses the selection and facilitates the transfer of the requested content. Where appropriate, a MIME handler plug-in is implemented to transcode the requested content into a MIME type that can be implemented by the remote packet-based device via which the request has been made. In certain applications, this MIME handler plug-in facilitates the transcoding of requested content into a format accessible at a particular remote packet-based device while also facilitating protection of the content by, for example, formatting the content to mitigate copying thereof. For general information regarding the transfer of data, and for specific information regarding the transcoding of data for use at a remote location that may be implemented in connection with one or more example embodiments of the invention, reference may be made to U.S. patent application Ser. No. 11/219,529, entitled "Data Communication with Remote Network Node," which is fully incorporated herein by reference.

The network-based server 110 also stores and uses content protection data 116 that includes a variety of information used by the host application router 112 to facilitate the transfer of protected content on behalf of a content provider. Content providers such as users or large-scale media providers (e.g., such as an Internet-based media download service) selectively provide the content protection data 116 for data transfer involving those content providers. The content protection data 116 may also include information from one or more media protection sources, such as those implemented globally across a particular type of media, or those regulated by government-type entities. The content protection data 116 may further be augmented by the network-based server 110 to include information useful in processing information on behalf of each user, such as global settings that may apply to more than one user, or user-specific settings that facilitate content transfer on behalf of that particular user.

The content protection data 116 may also include user preferences specifying a variety of user-specific preferences relative to the delivery of protected content. For instance where a user prefers the delivery of a particular format of content to his/her remote packet-based device, or where capabilities of the device require a particular format, that user may specify the format in user preferences. These particular formats may include one or more of those discussed above, such as a protected format, an unprotected format or a newly-protected format of data that has had an original content protection removed or otherwise altered.

The content protection data 116 may also include user preferences that specify configuration preferences for a particular type of interface presented to each user, which may specify characteristics of content protection such as manners in which to present and/or deliver available content, accessibility limitations (e.g., to associated users) and content transfer characteristics.

Where protected content is to be formatted with a new type of protection, the host application router 112 and/or the U.A.R. 132 accordingly works to format the content appropriately before sending the content to the user's remote packet-based device. Similarly, where the remote packet-based device is limited in application to a particular format (protective or otherwise), content sent to the remote packet-based device is configured into such a particular format. In addition, where appropriate, the host application router 112 and/or the U.A.R. 132 access requesting remote packet-based devices to determine a usable content format type and format the requested content appropriately. In certain applications, content requests from remote packet-based devices include such formatting information, with the host application router 112 and/or U.A.R. 132 implementing the formatting information in the request. These approaches may involve implementing the user application router at the user's content source for formatting the content and/or formatting the content at the network-based server 110 (e.g., as used with an agent application 250 shown in FIG. 2 and discussed below).

In certain applications where protection needs to be added to content and a content source and/or U.A.R. at that content source is not capable of adding such protection, the network-based server 110 facilitates the addition of the protection. For instance, content requested from the content source 130 by remote packet-based device 120 may need to be protected prior to transfer to the remote packet-based device. If the content source 130 and/or U.A.R. 132 are not capable of facilitating the protection, the network-based server 110 facilitates the protection either directly or via another network device (e.g., via another server or content protection processor).

In some implementations involving the addition of protection to content, the host application router 112 responds to an authorized request for content by directing the U.A.R. 132 to transfer unprotected content to the network-based server 110. The unprotected content is then protected in an appropriate manner amenable to use at a requesting packet-based device. The host application router 112 then routes the newly protected content to the requesting packet-based device.

In other implementations involving the addition of protection to content, the host application router 112 responds to an authorized request for content by directing the U.A.R. 132 to transfer content protected in a first format to the network-based server 110. The "first format" protected content is then protected with a new format that is amenable to use at a requesting packet-based device. The host application router 112 then routes the newly protected content to the requesting packet-based device.

In still other implementations involving the addition of protection to content, the U.A.R. 132 responds to a content transfer directive from the host application router 112 by first facilitating the addition of protection to requested content. This addition may involve the addition of protection to unprotected content, or the addition of protection to content protected n a different manner. This content protected via the U.A.R. is now routed to the network-based server 110 at the direction of the host application router 112 and U.A.R. 132. This content to which protection has been added via the U.A.R. 132 is then protected with a new format that is amenable to use at a requesting packet-based device. The host application router 112 then routes the newly protected content to the requesting packet-based device.

The content protection data 116 selectively includes information used by the network-based server 110 to communicate with and/or access each user's content source, such as security information for use with content protected at each user's content source. Where a user has more than one content source, such as with a business or household "user" having different computers used by different individuals, the content protection data 116 reflects protection associated with these multiple content sources, where applicable.

One particular user access approach involving multiple content sources involves remote user access to multiple network-based content sources from which the user is authorized to access content. For example, where a user at the remote packet-based device 120 purchases content such as a movie, music or software, a content provider having multiple data sources at which the content or media is located can grant the user access to these multiple sources for downloading the purchased content. In this regard, a user can download content for a single purchase from multiple sources, thus speeding the delivery of content. This approach may also involve the use of different content sources implemented by users subscribing to a particular service, with each user making content available at his or her content source for subsequent transfer to an end user at a remote packet-based device. In these instances, the host application router 112 works with user application routers at each involved content source to manage the content transfer and any appropriate content protection characteristics.

Depending upon the particular application and type of content being transferred, the network-based server 110 tracks the transfer of content between the content sources 130-N and the remote packet-based devices 120-$i$. Where content having associated media rights (e.g., copyright) is transferred, the network-based server 110 tracks the transfer of the content to ensure that regulations associated with particular media rights are followed. For instance, where purchased music is transferred, rights associated with the music may limit the distribution of the music to users other than the purchaser. In this regard, the network-based server 110 tracks any transfer of purchased music to ensure that applicable regulations are met.

The system 100 is adapted to work in a variety of environments involving disparate networks, content source devices, remote packet-based devices, content and protection characteristics thereof. One particular use-case scenario involves remote content access as follows. When a particular user who is party to the content source 130 (e.g., a homeowner having media content stored at his or her home computer) wishes to establish remote access, the user signs up for a service provided via the network-based server 110. The network-based server 110 prompts the user for access information to the user's content source 130 so that the host application router 112 can interact with the user's content source. This access information includes sufficient information for identifying the content source 130 on the network 105 and other appropriate information, such as content locations at the content source 130 that are accessible by the network-based server (and/or by remote packet-based devices). The access information is stored with the content protection data 116, together with other information for the user as appropriate for the particular implementation.

The U.A.R. 132 (software implemented, e.g., on the user's home computer, router or other network appliance) is installed at the user's content source 130 and is configured for operation in connection with the host application router 112. In some instances, some of the functions discussed as carried out with the host application router 112 are established and/or implemented at the user application router 132, such as the limiting of access to particular content locations at the content source 130.

An account is established for the user, with service type information (e.g., billing information) at the network-based server 110. The account includes authorization information established with the user, which is presented to the user for use in accessing the network-based server and, accordingly, his/her content source 130 as well as account information via the network-based server. This authorization information is stored with authorization criteria 114.

The user employs the remote packet-based device 120 for accessing content at the content source 130 by visiting the interface (e.g., web browser) presented by the network-based server on behalf of the user. In some applications, a user application router type function is also implemented at the remote packet-based device 120. This content access may involve, for example, the use of an Internet-capable mobile telephone as the remote packet-based device 120, with the interface being accessed as a web page via the mobile telephone. The user provides authorization information to the network-based server 110 via the interface. The authorization information may involve one or both of user-input authorization information (e.g., a password or voice for voice recognition) and identification information associated with the remote packet-based device 120. The network-based server 110 uses the authorization information together with the authorization criteria 114 to determine whether access is authorized.

Once the user has been authorized via the remote packet-based device 120, the network-based server provides the user with information regarding available content such as media content via the interface, viewed as a web page. One or both of the content source 130 and the network-based server 110 provide some of or the entire interface and a listing of available content for transfer and, where appropriate, a characterization of any media rights associated with that content. The listing of content may be tailored to a particular user's preferences, device capabilities, or otherwise limited in scope to restrict the content to which a particular user has access. The user selects content for transfer and the host application router 112 responds by interacting with the home application router 132 to facilitate the transfer of content to the remote packet-based device 120. This content transfer is carried out in accordance with the user's selection and the content protection data 116.

Where the selected content requires formatting, such as where the user's remote packet-based device 120 desirably receives content in a particular format (associated with media rights or otherwise) as discussed above, the content is formatted using, for example, information stored at a content source (e.g., metatags) and known functionality of the remote packet-based device. For instance, where content is music and wherein the remote packet-based device 120 desirably plays music in a first format but the music is stored at the content source 130 in a second format, the music content is formatted into the first format prior to transfer to the remote packet-based device. These first and second formats may be formats representative of a type of music storage (e.g., mp3) and/or a type of protection associated with the music. The formatting is generally carried out at one or both of the content source 130 and the network-based server 110, depending upon the particular application. In some applications, the user application router 132 formats the content, prior to transfer to the remote packet-based device 120. The content is then transferred from the content source 130 to the remote packet-based device 120, via the network-based server 110 and/or directly via the network 105.

In some applications, the formatting involves the implementation of metadata, where available, associated with an application at the content source 130 to categorize or otherwise present the content to the remote packet-based device 120. For example, where a user requests a list of content falling under a particular identification type, such as all image content (e.g., a photo album), metadata that describes the content as image content is used to identify the content. The identified content is presented in a format amenable to display, audio playback or other access approach at the remote packet-based device 120. In some applications, the content is identification content, from which a user can select specific content for actual transfer of content (e.g., images) corresponding to the identification content. The selection is communicated to the content source 130, which responds by configuring the selected content for use at the remote packet-based device 120 and facilitates the communication thereof.

The type of format in which content is desirably received at a particular remote packet-based device is set in one or more of a variety of manners. In one application, the content protection data 116 includes information regarding the format of content for a particular packet-based device (or software implemented thereat) as described above; when a user requests content for that particular device, the network-based server 110 works with the content source to set the content in the format indicated in the content protection data. In another application, users manually select a content format when requesting content via a remote packet-based device. In other applications, the content format is automatically selected by one or both of the network-based server 110 and the content source to which access is requested, using information identifying the type and/or abilities of the packet-based device to which the content is to be transferred (e.g., as included in the request communication therefrom).

Referring again to the above scenario, another content transfer approach involves the delivery of streaming content to the remote packet-based device 120 via the network-based server 110. Streaming content may involve, for example, the passage of content from a streaming content appliance, such as a television tuner, a video camera or a radio receiver, or the streaming of content from a network-based streaming source, such as an Internet radio station or other live broadcast source, or from a network-based video source. This streaming of content may also involve the application of subscription services or other fee-based use authorization that is implemented in connection with the content transfer and is applicable, for example, on a user-specific basis. Where appropriate, the streaming content is protected.

The host and user application routers 112 and 132 work to configure the streaming content in a proper format and, further, to transfer the content at a desirable transfer rate, relative to available bandwidth. The transfer rate may, for example, be relative to the condition of the network 105 and may further be characterized by transfer-related characteristics such as quality of network connection and associated functions, such as buffer size and approach. Further, the format is optionally carried out as a condition of the network 105 and/or the remote packet-based device 120, as relative to available transfer rate and/or as relative to the type of content amenable for use at the remote packet-based device. For instance, where a user requests streaming music from the content source 130, the available transfer rate is used to select the format of the music. Where available transfer rate is low such as with a mobile telephone network, lower bit rate content is used to reduce the amount of content required to be transferred for the selected music (and, accordingly, also resulting in relatively lower quality audio). Where available transfer rate is high, such as with a high-speed Internet link such as a DSL link, high bit rate content is used, facilitating high-quality music listening.

In some streaming applications, streaming content is protected or otherwise controlled using one or more of a variety of approaches to comply, e.g., with rights associated with the content or other applicable rights, such as those implemented by government agencies in association with the delivery of content. For example, where streaming media is protected by media rights, the application router uses protection to ensure that the transfer adheres to associated media rights. A variety of protection approaches, such as those discussed below, are implemented in accordance with the particular application and content use characteristics of the particular remote access device that will be using the content.

Where streaming content is subject to government type rules, such as those associated with the rebroadcast of a television or radio broadcast or rules, the application router transfers the content (or prevents the transfer of content) in connection with the rules. For instance, where the rebroadcast of a television broadcast is not permitted, the application router transfers content to ensure that any user receiving the broadcast is doing so without introducing issues relating to the rebroadcast such as by ensuring that an end user receiving the broadcast is entitled to do so as an original broadcast. Such rebroadcast may be facilitated in accordance with, e.g., conventional transfer of broadcast content to a remote television in one's own home.

In some applications involving the transfer of streaming content such as television content, the host and/or user application routers 112 and 132 ensure compliance with blackout rules associated with a location in which the remote packet-based device exists. For example, where the broadcast of a particular streaming television signal is subject to blackout rules, such that the signal is not to be broadcast in a certain geographical region, the application router determines the location of the remote packet-based device before facilitating the transfer of the streaming content. Where the location of the remote packet-based device is in compliance with blackout rules, the application router enables the transfer of streaming content, and where the location is not in compliance with blackout rules, the application router disables the transfer of streaming content.

In one application, the remote packet-based device 120 is a mobile telephone. The host application router 112 identifies the location of the mobile telephone before enabling the transfer of content such as streaming content subject to blackout rules or other localization information. This identification may be facilitated using, for example, the identification of a local transmission location (e.g., a transmission tower or GPS) via which the mobile telephone communicates. When the location of the mobile telephone is determined, that location is used to determine whether the transfer of streaming content is appropriate, and the transfer is carried out (or not carried out) appropriately.

In another example embodiment, the network-based server 110 facilitates the transfer of content from one of the remote packet-based devices 120-*i* to one of the content sources 130-N, using an authorization approach similar to that discussed above. For example, when a user at the remote packet-based device 120 wishes to send an image to his/her content source 130, that user accesses the interface provided via the network-based server 110. Once authorized, the user uploads the image to the content source 130, which responds by accepting the image and storing the image locally. With this approach, image storage is facilitated with the remote packet-based device 120 while utilizing the content storage capabilities of the content source 130. When implemented with a camera device, the remote packet-based device 120 enjoys a large quantity of storage space for pictures relative, e.g., to conventional cameras (and camera phones) where space is limited to storage at the camera. Further, when images are uploaded to the content source 130, adverse conditions such as lost or stolen cameras or camera phones do not necessarily suffer an associated loss of image content, relative to conventional approaches where images are stored at the camera or camera phone. Where images are proprietary or otherwise desirably protected, one or both of the remote packet-based device 120 and the network-based server 110 formats or configures the images with appropriate protection and transfers and makes available the protected images accordingly as discussed above.

Some applications involving the selective transfer of content use a token or other deliverable authentication content to authenticate or otherwise enable a user to access and, where appropriate, use content. The token generally includes authorization information that is sent to a user at a remote packet-based device. For example, an electronic token may include a link to a particular web page hosted by the network-based server 110, with security type information embedded in the token for use in granting access to content stored at a content source. Information that can be used to access protected content is selectively included with this security type information. In addition, the token may also include information that can be used to link an end user with content, such as an identification of a storage location for the content. Furthermore, the token may include information specifying the type of content that can be used at a packet-based device from which a request for the content is made.

The token is generated using one or both of the host application router 112 and a user application router (e.g., 132) at the content source from which content is transferred. In some applications, a user accessing his or her content source via a remote packet-based device causes the content source and/or the host application router 112 to generate the token. A content source user then sends the token, such as via email, to an end user at a remote packet-based device. In some applications, the content source and end users may be the same person, for example where a particular user wishes to access his or her own content at a content source, when using a remote packet-based device.

A user at a remote packet-based device receiving such a token uses the token in one or more of a variety of ways to communicate with the network-based server 110 and ultimately to facilitate the transfer of content from a particular content source to which the token applies. In some applications, the end user implements the token directly, e.g., by clicking on a link associated with the token as sent in an electronic communication such as an email or instant message, or otherwise sending information associated with the token to the network-based server 110. Certain applications also require an end user to supply a password or other security criteria when implementing the token.

In some contexts, the token is implemented with a transmission report. That is, where a particular user at a remote packet-based device receives a token, that user sends a transmission report (e.g., by clicking on a link provided with the token) that is sent back to the network router. The network router (implemented at one or both of the host application router 112 and the user application router 132) in turn sends authentication and/or security information to the user at the remote packet-based device to make transferred content usable thereat. This approach may be implemented, for example, where the token includes a link to the content, where the token includes the content or where the token is delivered along with the content.

Certain implementations involve the use of tokens having a lifetime, with the tokens usable over a period of time and, in some applications, more than once. For instance, where a token provides access to a particular media file or files, a user holding the token at his or her packet-based device can access the particular media file or files throughout the lifetime of the token. In addition, when updates are made to the media file or files to which the token applies, notification can be sent to a user holding the token. For example, where a token grants access to a file including a personal digital photo album shared by multiple family members, each having token access, updates to the photo album can be announced to the family members.

For general information regarding the provision of access to data, and for specific information regarding token-type access approaches that may be implemented in connection with one or more example embodiments herein, reference may be made to U.S. patent application Ser. No. 11/374,414, entitled "Token-based Remote Data Access" and filed on Mar. 13, 2006, which is fully incorporated herein by reference.

Where the token includes information that facilitates access to protected content, a lifetime associated with the token can be implemented for granting access to the protected content. For instance, where a user at the remote packet-based device 120 downloads protected content, a token may specify a time period during which that token will make available information necessary to access the downloaded content. Outside of this time period, the token thus limits access to the protected content. In this regard, while a user at the remote packet-based device 120 may have the protected content stored for access at his or her discretion, the token limits the ability to actually view, hear or otherwise use the protected content to the specified time period or lifetime.

Another example embodiment is directed to the use of a token for promotional purposes, where user reaction to the token is tracked and used for promotions. For example, a token may include information enabling a user at a mobile telephone to access and download a ring tone that is a short music clip. If the user likes the ring tone and subsequently purchases music relating to the clip (or otherwise), information in the token is used to track that purchase. In some applications, a royalty (e.g., funds, service or other item of value) is given relative to the tracked purchase. The royalty may be facilitated, for example, by tracking the source of the token and giving that source a royalty based upon the purchase.

In another example embodiment, the host application router 112 and/or a user application router (e.g., 132) are configured to select a particular communications medium in the network 105 to use in sending content to a remote packet-based device. For example, certain remote packet-based devices are capable of connecting to different networks (e.g., implemented as represented by the network 105). Mobile telephones are one example type of remote packet-based device that can be used in connection with such an approach, where a particular telephone may be capable of receiving content over different communications links (e.g., via a GSM (global system for mobile communications) link, a CDMA (code division multiple access) link or a local wireless Internet link). In this regard, where multiple networks are available and where a particular packet-based device to which content is to be transferred is capable of receiving information via the multiple networks, the application router selects one of the networks via which to send content.

In some applications involving the transfer of protected content is protected, the host application router 112 and/or user application router select a particular communications medium that facilitates the transfer of content via a protected approach. For instance, certain content may be protected with rights that prevent that content from being transferred over a particular medium. Such a medium may be one that is considered less secure than others, or incapable of affording appropriate protection. In this regard, the content is routed over a medium that facilitates the protection. For example, where a particular file is not allowed to be transferred via wireless telephony media, that file may be restricted to transfer over a packet-based network that does not implement wireless telephone communications.

One application involving the above-mentioned approach to communications medium selection involves the use of a mobile telephone or other device configured to communicate via both a mobile telephone network such as a GSM network and a local wireless Internet link (e.g., commonly referred to as "wi-fi"). Where a mobile telephone network is available (as typically readily available for telephony communications), telephone and/or content communications can be sent via the mobile telephone network. Where a wireless Internet network link is available, content communications can be selectively sent via the wireless Internet network link, generally facilitating higher content transfer rates than mobile telephone links and, in many instances, relatively more economical content transfer. The wireless Internet link is also selectively used for telephony communications, e.g., where the mobile telephone is configured for Internet protocol (IP) telephony type communications. Where protection afforded to content dictates, the host application router 112 accordingly selects one of the wireless Internet network link or the mobile telephone network.

The combination wireless Internet/mobile telephone capable phone is used in a multitude of manners, depending upon the particular application, available networks, user configuration and service provider conditions. For instance, when such a mobile telephone is used in an area offering no wireless Internet link, or where any wireless Internet link is not robustly available, the mobile telephone network is used for content and voice communications. Conditions relating wireless Internet availability may be detected, for example, by the telephone itself or by the network-based server 110, e.g., by using information associated with an identified mobile telephone communications source such as a transmission tower. When the mobile telephone has access to a wireless Internet link, the link is used for communicating content and, in particular, for communicating content having a relatively large size (and thus benefiting from high bandwidth communications and potential lower cost communications channels). Such wireless links are typically available, for example, in airports, coffee shops, educational institutions or other locations where a wireless Internet link is desirable; furthermore, as wireless Internet technology grows, these links are becoming more widespread and are implemented publicly in a variety of regional locations.

In some applications, configuration settings in the mobile telephone, at the network-distributed application router or at other network devices in the system 100 are set to control the delivery of content to the mobile telephone as a function of the availability of a wireless network. For example, where a user requests content such as a movie or a presentation having a relatively large content file size, settings at one or more locations in the system 100 may be configured to transfer the content when a wireless Internet link is available to the mobile telephone. In this regard, user configuration may be implemented to make wireless Internet transfer a desirable option for content files over a certain size, with an option to override the settings to effect transfer over a mobile telephone network. This approach may be useful, for example, where immediate content transfer is not necessary or where a user elects to wait to transfer content until a wireless Internet link becomes available for economic or other reasons. In this regard, a user can request a particular set of content and the network-distributed application router (112 and/or 132) can be implemented to automatically transfer the requested content when a wireless Internet link becomes available to the mobile telephone or when a user specifically initiates the transfer.

Another example embodiment relative to the use/selection of wireless Internet networks and a mobile telephone network involves the transfer of content from a remote packet-based device (e.g., remote packet-based device 120 to content source 130 in FIG. 1). The transfer of content in this direction may be managed in a manner that is similar to the management of content transfer from the content source to a remote packet-based device. For example, where a video or picture(s) is taken with a mobile telephone, the file size associated with that video or picture(s) may be large. In this regard, the information can be selectively transferred to the content source relative to the availability of a wireless network. One such application involves the use of a camera phone; when a user has taken several pictures, those pictures can be uploaded to his or her content source when a wireless network is available. With this application, photos taken can be securely stored at a content source while freeing up space at the camera phone for taking additional pictures. Many other applications (e.g., video) are implemented in a similar manner.

Referring again to FIG. 1, the selection of a particular network over which to send content may involve the consideration of one or more of a variety of network characteristics, such as transfer rate, reliability, availability, rights protection, cost and others including, for example, those discussed above. Users employing the network-based server 110 for the transfer of content may also provide user-specific content regarding preferences for content transfer in the realm of multiple available types of networks. The preferences may be provided in the form of user-specific data such as the content protection data 116 (or other data accessible by the network-based server 110) that the application router can access and use in selecting a particular content transfer network or time, or may involve a selection by a user at a remote packet-based device made in connection with a particular content transfer event. These user preferences or selections may involve the direct selection of a particular network or, for example, the selection of criteria for use by the network router in selecting a network on behalf of a user. In this regard, the host application router 112 and/or appropriate user application router employs criteria in selecting a particular network via which to send content and, in some applications, in selecting a particular time during which to send the content.

In another example embodiment of the present invention, a smart cache 140 is implemented with the system 100 for storing (caching) content to be transferred over the network 105 to one or more of the remote packet-based devices 120-i. The smart cache 140 is configured for storing content with any appropriate protective approaches and accordingly involves devices such as a database system or other content storage arrangement accessible by the network-based server 110. The smart cache 140, while shown as a separate arrangement, can be selectively implemented with one or more of the devices/networks shown in the system 100, such as with the content source 130, the network 105, the network-based server 110 (or a different network-based server) or a remote packet-based device 120. In some applications, content in the smart cache 140 includes content belonging to a particular group of associated data and, where that group is accessed by a remote packet-based device, the content in the smart cache is made available.

When content is transferred between one or more of the content sources 130-N and one or more of the remote packet-based devices 120-i, the smart cache 140 can be implemented as a buffer and/or storage arrangement. For example, when a user at content source 130 wishes to make selected audio content (e.g., certain music) available to his or her mobile telephone or other remote packet-based device, that user can initiate content transfer, using the host application router 112 together with the user application router 132 to the smart cache 140. In addition, where content is to be configured for implementation at a remote packet-based device, the smart cache can be used for storing content from the content source, with the host application router 112 facilitating the configuration of the stored content into a format amenable to the remote packet-based device, and subsequent transfer of the configured content. This content is then available for subsequent download and/or streaming to the user's remote device. In a reverse transfer application, content can be transferred from a remote packet-based device to the smart cache 140, irregardless of availability of a particular content source to which the content is sent. Subsequently, the content source can access the smart cache 140 to retrieve the content. With these approaches, a content source or remote packet-based device need not necessarily be accessible to facilitate a transfer of content. Furthermore, where transfer of content involves the transfer of streaming content, the smart cache 140 can be implemented as a buffer to accommodate potential problems with communicating over one or more links in the network 105, or simply to pause the stream of content (e.g., to pause video and/or audio playback).

One approach to the transfer of protected streaming content such as a movie or audio file with the smart cache 140 involves the use of the smart cache to facilitate the protection of the streaming content. For instance, where a user at the remote packet-based device 120 requests a particular media file from the content source 130, the user application router 132 works at the direction of the host application router 112 to route the media file from the content source to the smart cache 140. By routing the data to the smart cache, subsequent streaming transfer of the media in the file to the remote packet-based device 120 is facilitated.

Another application of the smart cache 140 involves the cache implemented at a content source, such as in a personal computer or with a storage device at the content source 130. Generally, where a user application router 132 is active and the cache is active (or can be activated by the user application router 132), access to the cache is available to a remote packet-based device. In this regard, a user at a packet-based device such as a personal computer can transfer content to the smart cache 140. Once transferred, the personal computer or other appliance can be shut down while ensuring that the content is available in the cache for access. For example, where a network attached storage (NAS) device is implemented at the content source 130, a user at a PC at the content source can designate a particular file in the NAS to be available for content transfer. The NAS (or a file therein) acts together with the user application router 132 as the smart cache 140; access and content transfer are effected in a manner similar to those discussed herein.

In some applications, the user application router 132 administers the storage of content in the smart cache 140 using conditions relative to the particular type of content transfer scenario in which the smart cache 140 is implemented. Where use of the smart cache 140 is appropriate or otherwise beneficial, the user application router 132, possibly in connection with the host application router 112, facilitates that use by automatically managing transfer to and from the smart cache. In other applications, a user at a content source or remote packet-based device manually directs the storage and/or retrieval of content at the smart cache 140, such as by physically storing information at a local or remote content storage (cache) location. Depending upon user selections, certain content may be stored in the smart cache 140 based on a rule implemented with the user application router 132, such as for content a particular user needs to access on a regular basis or for content requiring a long time for transfer, such as video content.

In some applications, the network-distributed application router accesses the smart cache 140 using a protocol-based approach for retrieving content. For example, where a user at the remote packet-based device 120 requests content made available via the content source 130, the network-distributed application router ascertains whether the requested content is available in the smart cache 140. If the content is available at the smart cache 140, the content is transferred to the remote packet-based device 120. If the content is not available at the smart cache 140, the network-distributed application routing controller accesses the content source 130 to retrieve the content.

When content is undergoing transfer to the smart cache 140, one or both of the user application router 132 and the host application router 112 monitor the content transfer and, where appropriate, communicates with the device making the transfer to ensure that the transfer is effected properly. For example, where a user elects to transfer content from his or her PC to the smart cache 140, the transfer is monitored to ensure that it is successful. For instance, if a user attempts to shut down his or her PC or otherwise interrupt the transfer, a warning communication (e.g., a pop-up message on a PC monitor) is generated to alert the user that the transfer has not been completed.

In another embodiment involving the smart cache 140, content is streamed to a remote packet-based device using the smart cache to store some or all of the content as a buffer. For example, where a user orders a movie, via a content source 130, to be downloaded for playback at a remote packet-based device 120, a selected amount of the video content for the movie can be stored at the smart cache 140. Once playback is started, content sent for playback is deleted from the cache 140 or otherwise made inaccessible, with remaining content for the movie being sent to the cache 140 or, in some instances, directly to the remote packet-based device 120. In some applications, the content stored at the smart cache 140 is unusable at the remote packet-based device (or any appliance) until an enabling stream of content, such as that involving encryption information or video content, is sent to the remote packet-based device. This enabling stream of content is used to make the movie content available at the remote packet-based device. With these approaches, movie content is transferred, with at least a portion of the movie content stored in the smart cache 140, while maintaining relevant media rights to the movie in that a usable copy of the movie is not necessarily stored at any location.

One approach to the transfer of protected streaming content such as a movie or audio file with the smart cache 140 involves the use of the smart cache to facilitate the protection of the streaming content. For instance, where a user at the remote packet-based device 120 requests a particular media file from the content source 130, the user application router 132 works at the direction of the host application router 112 to route the media file from the content source to the smart cache 140. By routing the data to the smart cache, subsequent streaming transfer of the media in the file to the remote packet-based device 120 is facilitated.

The smart cache 140 protects the content in that end users are not able to access the content in its entirety. The host application router 112 then directs the streaming of the content from the smart cache 140 to the remote packet-based device 120. Once content is accessed (e.g., viewed or heard) at the remote packet-based device 120, that content is no longer accessible by the remote packet-based device. As content is accessed, additional content is streamed from the smart cache 140. In this regard, the host application router 112 makes available only a small portion of the content to the user at the remote packet-based device 120 during a particular time period, thus mitigating the ability of a user at the remote packet-based device 120 to capture the content in its entirety.

Other applications are directed to a token approach, similar to that discussed above, using the smart cache 140 to store information to which a token is directed. For example, where a user at a content source sends a token for use at a remote packet-based device for retrieving a particular set of content, the particular set of content can be stored in the smart cache 140. The token may, for example, point to the section of the smart cache 140 in which the content is stored. When a user at a remote packet-based device implements the token, the particular set of content at the smart cache is sent to the remote packet-based device.

The content source 130 and user application router 132 are implemented in a variety of manners, depending upon the application. In some applications, the user application router 132 is located at a home computing device such as a desktop or laptop computer. In other applications, the user application router 132 is programmed into a router, modem, content storage device or other user device implemented in a home, office or other (generally local) network system. Furthermore, the user application router 132 can be implemented with one of the remote packet-based devices 120-i in certain applications. In this regard, FIG. 2 shows different example embodiments involving a user application router and a multitude of different content types and/or storage arrangements.

Figure 2:
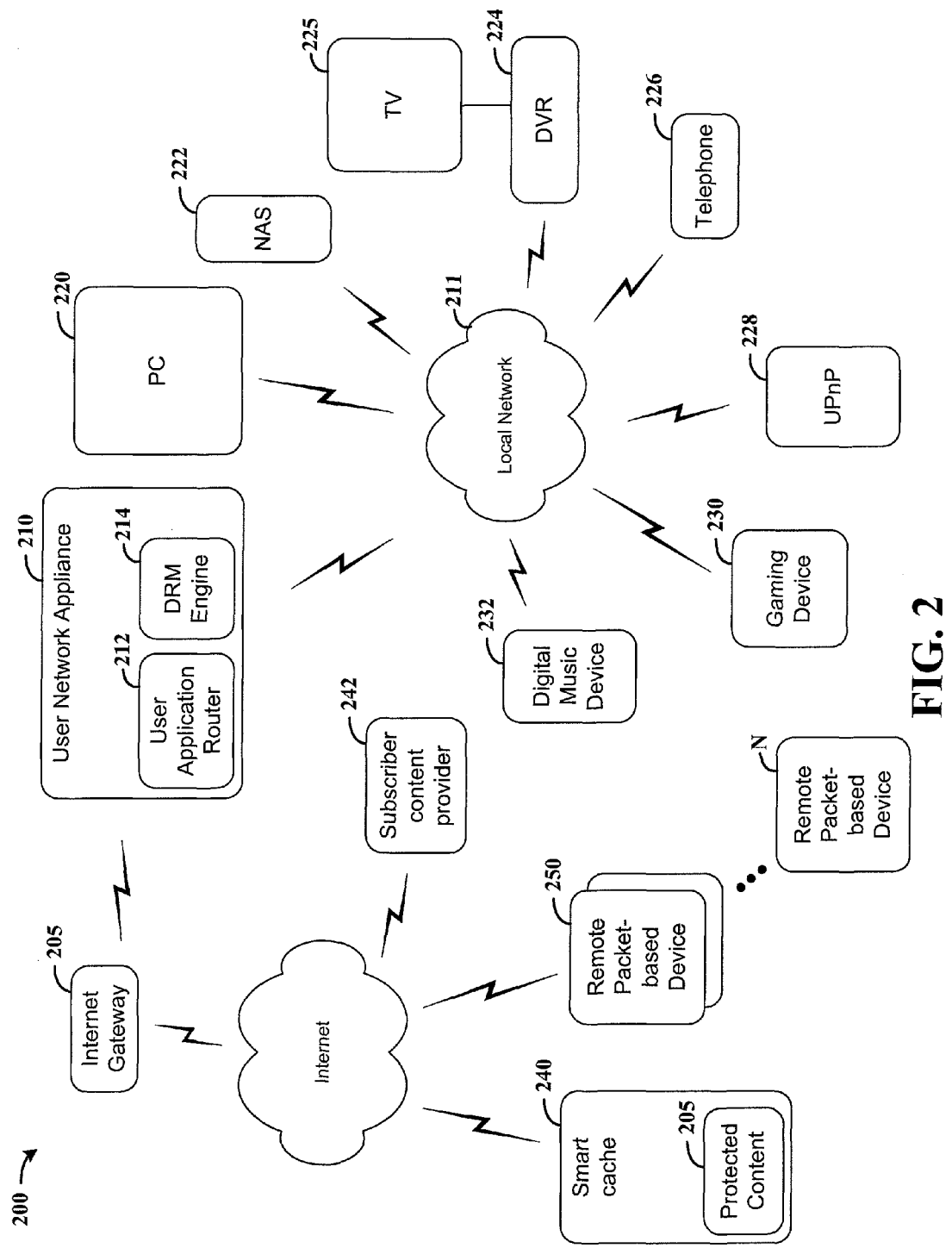
FIG. 2 is an arrangement showing various approaches to the routing of protected content from a personal content source to a remote user at a packet-based device, according to another example embodiment of the present invention.

FIG. 2 shows a network arrangement 200 involving a content source implemented with a variety of content devices, according to another example embodiment of the present invention. This approach shown in FIG. 2 may be implemented in connection with one or more of the content sources 130-N as described with FIG. 1, with some or all of the devices shown in FIG. 2 making up such a content source.

A registered user device 210 acts as a packet-based network access appliance at a home location via which content is accessed (either directly or via another local device) from one of a plurality of remote packet-based devices 250-N, with a smart cache 240 selectively implemented to store protected content 205 as discussed above. The registered user device 210 communicates to the packet-based network via a gateway 205 such as a modem, and includes a user application router 212 and digital rights management engine 214. In some applications, the gateway 205 and the registered user device 210 are integrated into a single appliance. Similarly, the registered user device 210 is selectively implemented with one or more of a variety of other devices to which it is connected via a local network 211 (e.g., with PC 220), discussed further below.

The user application router 212 functions in connection with a host application router such as host application router 112 in FIG. 1 (thus, operating in accordance with that discussed above with user application router 132). The DRM engine 214 facilitates any media rights processes or approaches performed at the registered user device 210, for example as discussed above in connection with those functions performed at the content source 130.

Shown by way of example are individual content sources including a personal computer 220, network attached storage (NAS) device 222, digital video recorder (DVR) 224 (or, e.g., a PVR) optionally coupled to a TV 225, a telephone 226 (e.g., an IP telephone), a universal plug and play (UPnP) device 228, a gaming device 230 and a digital music device 232. Some or all of these individual content sources are selectively implemented, for example with the content source 130 of FIG. 1. These devices are selectively connected via the local network 211 with the user application router 212 controlling access to one or more thereof for file transfer or streaming content transfer with one or more of the remote packet-based devices 250-N. Furthermore, the shown devices may communicate with one another, directly or via a router, for transferring content and/or implementation user application router functions.

In some applications, one or more of the individual content devices 220-232 is selectively implemented as a remote packet-based device 250, with the user application router 212 working at the direction of a host application router implemented to facilitate the transfer of content via the local network 211. For instance, where a user records a television program on his or her DVR 224 and wishes to view that program at the PC 220, the user application router 112 selectively facilitates the routing of the content by implementing the DRM engine 214 to address any digital rights associated with the recorded television program. This approach is particularly useful where, for example, the local network is a network shared by several users, for example where the local network is used in an office or apartment complex setting.

In some applications, content available from one or more of the individual content sources 220-232 is configured and provided to one of the remote packet-based devices 250-N using one or more of the approaches described herein. For example, where the DVR 224 includes video content stored for use by a particular DVR application, a plug-in for the DVR is selectively implemented to access content at the DVR in categories or other arrangements identified, for example, with metadata. The identified categories are provided to the remote packet-based device in a format amenable to browsing through the categories and selection of a particular video (e.g., asset) for playback. Selected video content is configured for playback at and communication to the remote packet-based device, using information characterizing available functions at the remote packet-based device. For instance, where the remote packet-based device has particular browser-based video playback capabilities, the video content is configured in a format amenable to playback in accordance with those capabilities.

In some applications a subscriber content provider 242 is coupled to deliver protected content subscribed to by a user at the registered user device 210. When that user wishes to access the subscription content at the remote packet-based device 250, the user application router 212 implements the DRM engine 214 at the direction of a host application router (e.g., 112 of FIG. 1) for providing the subscription content to the remote packet-based device 250. In some applications, content provided by the subscriber content provider 242 is routed from the subscriber content provider 242 directly to the remote packet-based device 250 via the packet-based network. In other application, content is routed from the subscriber content provider 242 to the registered user device 210 (and, where appropriate, to one of the content devices 220-232), and re-routed to the remote packet-based device 250.

In some applications, a content key is included with a token that is provided to a remote packet-based device 250. The token is implemented as discussed above to access data via the user network appliance 210, for example, in a manner similar to that discussed above. Generally, a user implements the token to both request content and, upon receiving the content, to make the content accessible (e.g., decrypt the content).

In other applications, a content key is provided to the remote packet-based device 250 with a lifetime associated with the key. That is, the time during which the key is valid is limited in one or more manners, such as to limit access to content to a particular use (e.g., one-time playback of a video), or to a particular time period (e.g., valid for one day).

In still other applications, a content key, token, or other item that facilitates access to data is provided for content access as a function of the location of the remote packet-based device 250. For instance, where a user of the device 250 is authorized to access content and requests that content for use at a particular location, the content can be made available for use at the location while the user is present, and either rendered unusable or otherwise controlled so that it cannot be used after the user leaves the location. In one application, playback of media is implemented in a manner that requires repeated access to a key or token, repeated receipt of key or token data, or receipt of new key or token data during playback, such that a one-time delivery of a key or token is not sufficient for playback of all of the media. This approach facilitates an interruption of playback when a user departs, in that key or token data is not accessible at some point thereafter.

One example implementation involving user location-based access as discussed above is as follows. A user at the remote packet-based device 250 elects to access video content when visiting a friend's home, and wishes to view the video content on the friend's video monitor. The content is then made available for use at the video monitor, either directly from a network source (e.g., a network-based server 110 implemented with FIG. 2) or from the remote packet-based device 250. When the user leaves the friend's home, access to the video content at the video monitor is inhibited or prevented. The location of the remote packet-based device 250 may be detected, for example, by identifying the location using an approach such as global positioning, or by detecting that the device is not within a certain proximity of the video monitor. In some applications, a key or token used to access the video content is provided via local communications from the remote packet-based device 250, such that continuous playback of the video content requires the presence of the remote packet-based device. In other applications, the key or token is provided via a network source as described above, based upon a detected location of the remote packet-based device 250.

Referring to both FIG. 1 and FIG. 2, in another embodiment, the location and use of a content key is controlled via the network-based server 110. For example, where a remote user at a remote packet-based device 120 (or 250) requires a key stored for use with data at a content source 130 or user network appliance 210, the network-based server 110 controls the transfer of the key to the remote user. In some applications, once the key is transferred it is no longer useful at the content source 130 or user network appliance 210. With this approach, the key is usable in only one location at a time. This approach facilitates the control, for example, of access to media content to a single user and mitigates the potential of the media content being duplicated and used by more than one user at a time.

In certain applications, the network-based server 110 also facilitates the removal of protected content from a remote device after a particular time period, after the protected content has been used, or under another condition. For instance, in a manner consistent with the previous paragraph, the transfer of a key to a remote device may be followed by a re-transfer of the key to a content source; upon re-transfer of the key, the media content delivered to the remote device may also be controllably removed or otherwise made unusable by the network-based server.

In other embodiments, the network-based server 110 further controls the limited distribution of a key as described above to registered locations. For instance, where a registered user purchases media content such as music and stores the music at his or her content source 130, that user may also register a remote packet-based device 120 such as a telephone or digital audio player to playback the music. This registration is recorded and used by the network-based server 110 to selectively deliver the key between the content source 130 and the remote packet-based device 120, in accordance with any rules specified by a content provider from which the media content is obtained.

In another embodiment, the network-based server 110 controls use of media content purchased by a user, with the content accessed via a registered user's content source 130 or, in some applications, a network cache 140. When the user wishes to use the media content at either his or her content source (e.g., home PC) or at a remote packet-based device (e.g., mobile telephone), the network-based server 110 provides a key to the user at the particular device at which the user is accessing the media. Access to the key is limited to a single registered location, such that a registered user cannot provide access to the content at more than one place at a particular time. When the network-based server 110 provides the key for use at a particular device, the key and/or the content to which the key applies is removed or otherwise made inaccessible at any other device previously having access to the content. Such an approach may be useful, for example, where a user wishes to access purchased media content such as music, at different locations; the network-based server facilitates this access In still another embodiment, the network-based server 110 facilitates access to a content-owning registered user's content at a remote device belonging to another registered user, while the content-owning registered user is in the presence of the other registered user's device. For instance, where a content-owning registered user has video stored at a home video recorder (see, e.g., FIG. 2 and DVR 224) and is visiting a friend's home, the network-based server 110 facilitates delivery of the video to a video device (e.g., television or computer) at the friend's home. The key is provided to the content-owning registered user, for use with the video device at the friend's home. In some applications, the key is provided to a mobile device such as a mobile telephone possessed by the content-owning registered user, and the key is used via the mobile device to make the content available at the friend's home. In other applications, the network-based server 110 uses GPS (global positioning) information available from the content-owning registered user's mobile device to ensure that the registered user is present at the friend's home, before providing content and/or a key thereto. Once the registered user leaves the friend's home, any content delivered to the friend's home is removed or otherwise made unavailable.

Figure 3:
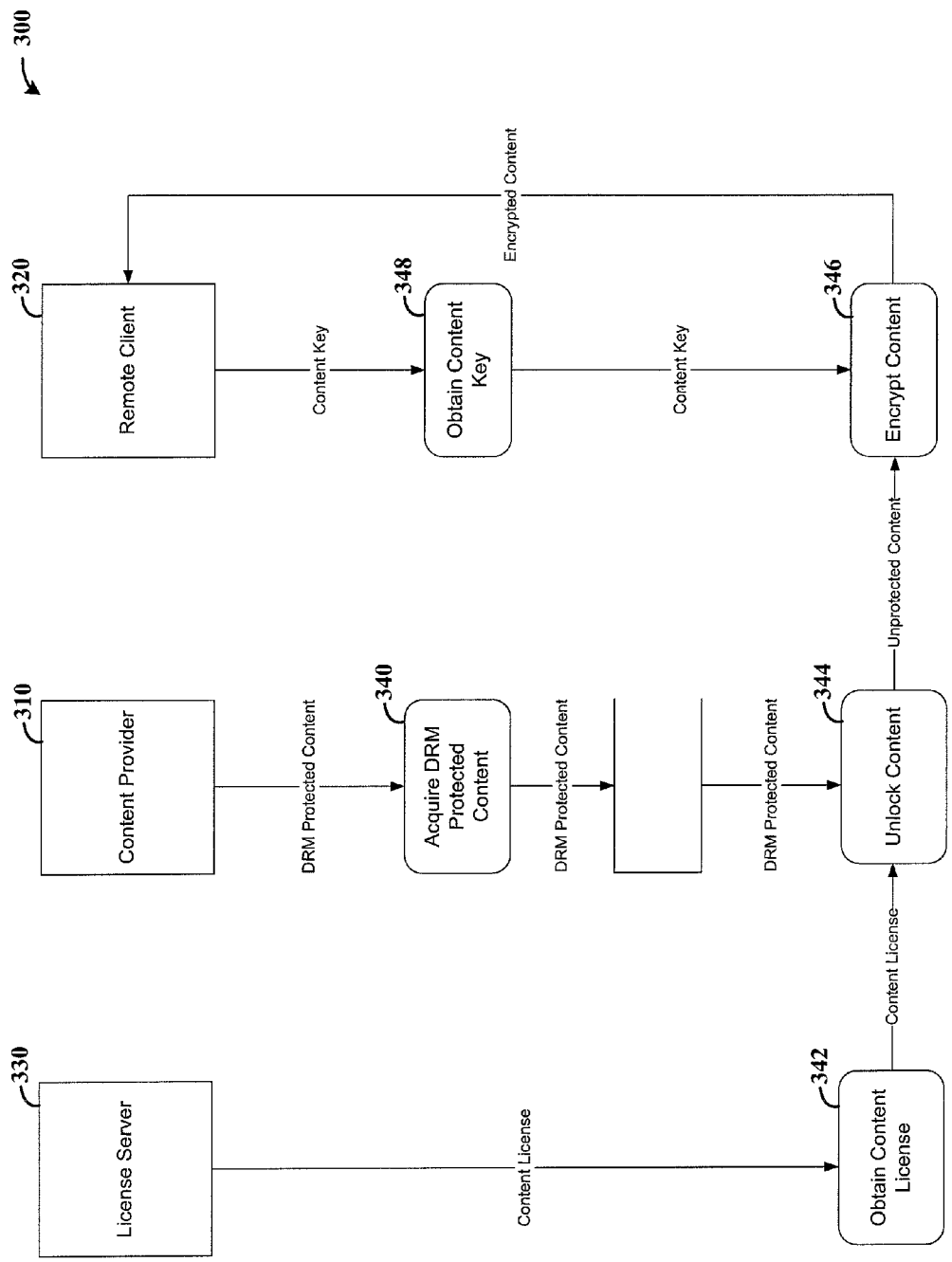
FIG. 3 is a data-flow diagram for an approach to routing protected content, according to another example embodiment of the present invention.

FIG. 3 is a data-flow diagram for an approach to routing protected content, according to another example embodiment of the present invention. A protected-content routing system 300 includes a content provider 310 that provides content such as media content for use by a remote client 320, and a license server 330 that facilitates the use of provided content in accordance with applicable rights associated with the content. The approach shown in FIG. 3 (and also that shown in FIG. 4 and discussed further below) may be implemented, for example, with a system such as those shown in FIG. 2, with a user network appliance (e.g., 210) carrying out various functions related to the acquisition of protected content, and the delivery of the protected content to the remote client 320.

At block 340, DRM-type protected content is acquired from the content provider 310. The DRM-type protected content is stored or otherwise made available for subsequent use. In some implementations, the DRM-type protected content is stored in a protected fashion, such that any use of the content requires that the content be made accessible (e.g., unlocked). In other implementations, the protection of the DRM-type protected content is removed, prior to storing for use.

When the content is to be readied for use, a content license is obtained from a license server 330 (or similar source) at block 342, and the content is unlocked at block 344 to remove any protection from the content, either at a time of use or prior to storage as appropriate for the particular implementation. As discussed above, the acquisition, unlocking and storage of content for use can be implemented, for example, at a user network appliance (e.g., a registered user's home PC). Generally, the license obtained at block 342 is specific to the particular user unlocking the content at block 344, with the license including information that is accessible by the user and that that includes information for unlocking the acquired content (e.g., which is protected in a similar manner for a multitude of such users).

When the remote client 320 wishes to access the content unlocked at block 344, the unprotected content is encrypted at block 346 with a key, and sent to the remote client 320. The encryption at block 346 involves, for example, encrypting the content to protect the content in a fashion that does not necessarily require a content license as obtained at block 342. In some applications, the encryption and key at block 346 is specific to a particular remote client (e.g., where the same key can be re-used for different data), or is newly generated each time content is provided to the remote client 320. The remote client 320 then obtains a content key at block 348, which is used to make the encrypted content usable at the remote client 320.

Figure 4:
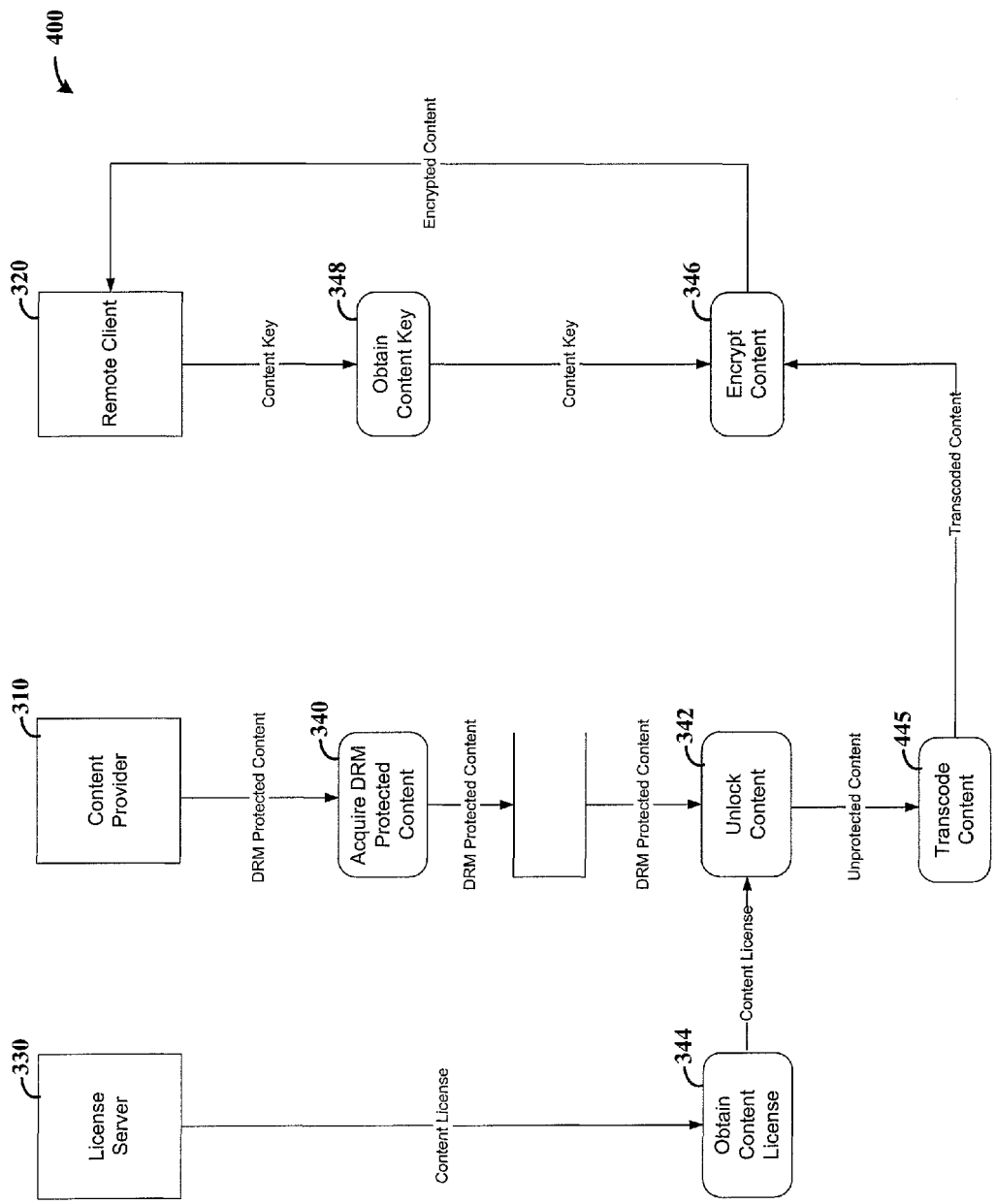
FIG. 4 is another data-flow diagram for an approach to routing protected content with transcoding, according to another example embodiment of the present invention.

FIG. 4 is another data-flow diagram for an approach to routing protected content with transcoding via a protected-content routing system 400, according to another example embodiment of the present invention. Various embodiments implemented in connection with FIG. 4 can be implemented in a similar manner to that shown in and described in connection with FIG. 3; in this regard, FIG. 4 uses similar numbering to that used in FIG. 3, with certain related discussion omitted for brevity.

With FIG. 4, protected content is acquired, unlocked and provided to a remote client 320 in an encrypted form. Prior to encrypting the protected content, the content is transcoded at block 445 for use by the remote client 320. The transcoding makes the content usable, or otherwise provides the content in a desirable format for, the remote client 320.

The transcoding at block 445 involves one or more of a variety of functions. For instance, where acquired content requires relatively high bandwidth for transfer, it may be desirable to provide the content in a format that requires less bandwidth. In another example, where protected content is in a format that is not amenable for use at the remote client 320 (e.g., where the remote client does not have software that facilitates access or playback to the content), the content is transcoded so that it can be used by the remote client with the particular software (or hardware) available. For general information regarding the transfer of data, and for specific information regarding the transcoding of data for use at a remote location that may be implemented in connection with one or more example embodiments of the invention, reference may be made to U.S. patent application Ser. No. 11/219,529, referenced above.

Figure 5:
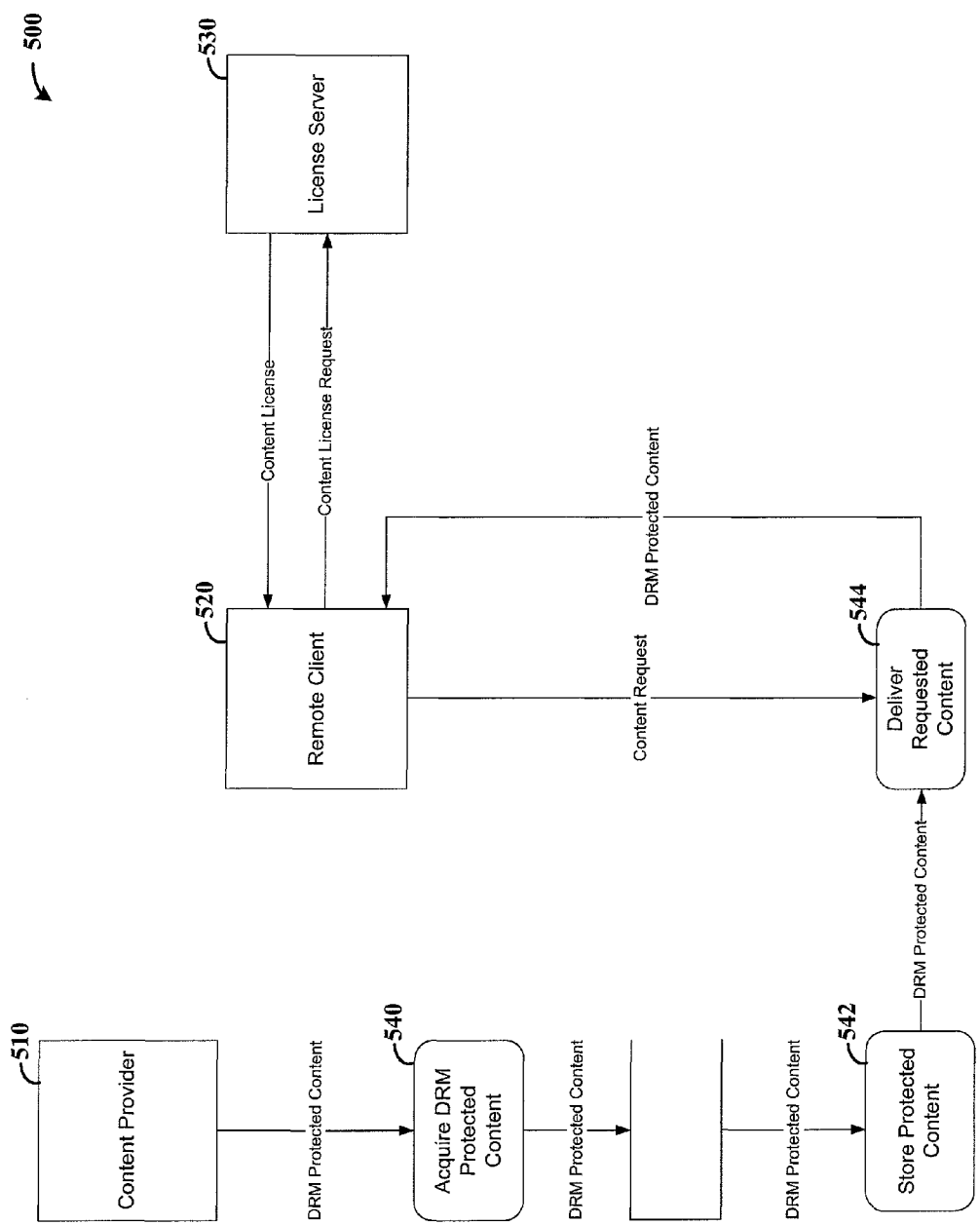
FIG. 5 is another data-flow diagram for an approach to routing protected content, with remote-client access to license information, according to another example embodiment of the present invention.

FIG. 5 is another data-flow diagram for an approach to routing protected content via a protected-content routing system 500, with remote-client access to license information, according to another example embodiment of the present invention. The system 500 is similar to that shown, for example, in FIG. 3, with certain portions therein labeled similarly by way of example. When a home-user (e.g., at a user network appliance such as the appliance 210 in FIG. 2) purchases protected content from a content provider 510, the protected content is acquired at block 540 and stored at block 542, with the content in a protected form.

When a remote client 520 wishes to obtain the protected content for use, the client requests the content and, at block 544, the requested content is delivered to the remote client 520. In this manner, the content is stored a first location and provided upon request to a second location without necessarily using and/or manipulating any protection characteristics of the content. This approach is useful, for example, where a registered user purchases media content such as music and stores all of his or her music at his or her home PC (e.g., where storage of all media content at a remote device is undesirable or impossible).

Once the remote client 520 has the content, the remote client can use the content by requesting a license directly from a license server 530. Such a request may include, for example, password or key information, delivered with the protected content or otherwise provided to the remote client. In return, the license server 530 provides a content license to the remote client 520, which uses the license to access the protected content.

Figure 6:
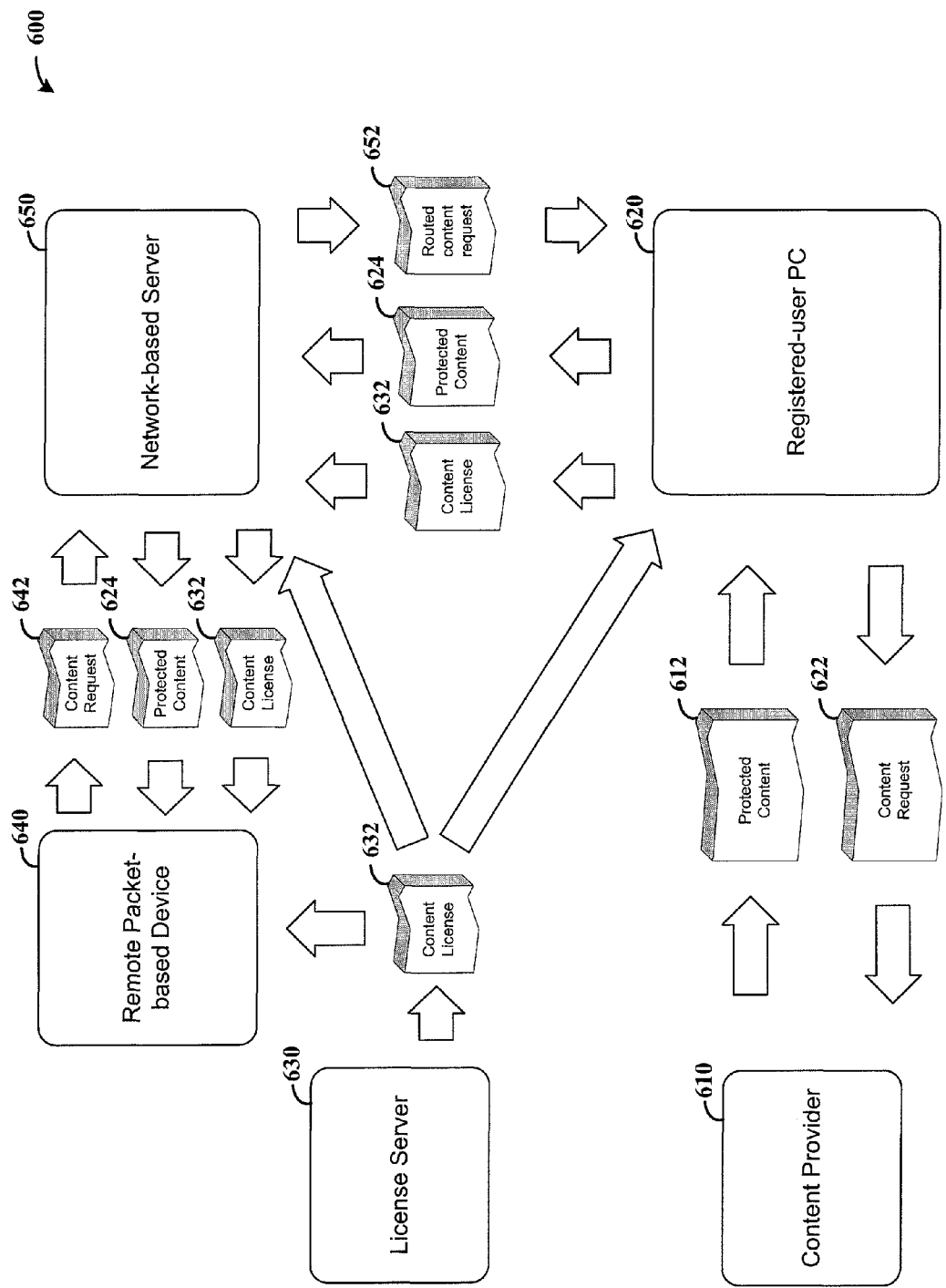
FIG. 6 is another data-flow diagram for an approach to routing protected content, with selective delivery and management of a content license, according to another example embodiment of the present invention.

FIG. 6 is another data-flow diagram and system 600 for an approach to routing protected content, with selective delivery and management of a content license, according to another example embodiment of the present invention. A content provider 610 provides protected content to a registered-user PC 620 (or other communication device), and a license server 630 manages a license for the provided content, selectively providing a license to one or both of the registered-user PC and a remote packet-based device 640.

When a registered user at the registered-user PC 620 wishes to purchase content (e.g., music via the Internet), a content request 622 is sent to the content provider 610. In response (and, e.g., with appropriate payment for the content), the content provider 610 provides protected content 612 to the registered-user PC 620.

When the registered user, or another authorized user, at the remote packet-based device 640 wishes to access the protected content at the registered-user PC 620, a content request 642 is sent to a network-based server 650 that processes the request to authenticate the user at the remote packet-based device. The network-based server 650 may be implanted using, for example, approaches similar to those discussed above with FIG. 1 to respond to such a request, authorize a user and facilitate the delivery of protected content. In this regard, where the user at the remote packet-based device is authenticated, and where appropriate, when the request is authenticated, the network-based server 650 passes a routed content request 652 to the registered-user PC 620.

The registered user PC responds to the routed content request 652 by passing the requested protected content 624, having protection as provided via the content provider 610, back to the network-based server 650. This routing of the protected content from the registered-user PC 620, at the direction of the network-based server 650, uses an approach such as that described above, with application routing functions at the registered-user PC responding to the network-based server to facilitate the routing.

The network-based server then passes the protected content 654 to the remote packet-based device 640 to serve the request. Once the protected content 654 is received at the remote packet-based device 640, the protection needs to be removed in order for a user at the remote packet-based device to access the content, which is facilitated by a content license 632.

In FIG. 6, three different embodiments are shown for different approaches to providing a content license 632 to the remote packet-based device 640. In one embodiment, the content license is received directly from the license server 630, which provides the content license. In some applications, the license server 630 provides the content license 632 in response to a request from the remote packet-based device 640 (e.g., upon authentication of a registered user who purchased the protected content). In other applications, the license server 630 provides the content license 632 to the remote packet-based device 640 in response to a request from the registered-user PC. In still other applications, the license server 630 provides the content license 632 to the remote packet-based device 640 in response to a request from the network-based server 650. Where the request is made by the network-based server 650, the purchase of content delivered to the registered-user PC 620 involves an authentication of the network-based server 650 to facilitate such a content license request.

In another embodiment, the content license 632 is provided to the registered-user PC 620 from the license server 630, either directly in response to the purchase and delivery of the protected content 612, or in response to a later request from the registered-user PC. When protected content 624 is provided to the remote packet-based device 640, the content license 632 is passed from the registered-user PC 620, to the network-based server 650 and on to the remote packet-based device.

In another embodiment, the content license 632 is provided to the network-based server 650 from the license server 630. The network-based server 650 then provides the content license 632 to the remote packet-based device 640 for use with the protected content 624. In some applications, the network-based server 650 also provides the content license 632 to the registered-user PC 620 when the protected content 612 is to be used at the registered-user PC.

In some embodiments, the network-based server 650 manages the delivery and, where appropriate, the lifetime of the content license 632 to ensure that the protected content is used in accordance with any applicable rules associated with the content. This approach is applicable, for example, in either of the two above-discussed embodiments involving the transfer of the content license 632 to the remote packet-based device 640 from the network-based server 650, or to the registered-user PC 620 from the network-based server 650. With this approach, the network-based server 650 manages the use of protected content while enabling the protected content to be used on two or more devices. For instance, where a user wishes to purchase music and make that purchased music available at the user's home, in the user's auto and on a portable music player (e.g., mobile telephone), that user can register for such a service with the network-based server 650 and content provider 610. The content license 632 is then provided either to the network-based server 650 or to the registered-user PC 620 for storage, with the network-based server controlling the use of the content license. When the user wishes to listen to the purchased music at the remote packet-based device 640, the network-based server 650 facilitates the delivery of the music as well as the content license 632 to the remote packet-based device. When the same user later wishes to listen to the purchased music at a different remote device or at the registered-user PC 620, the network-based server 650 facilitates the delivery of the license 632 to the appropriate location while ensuring that rules associated with the music are followed. For instance, where rules indicate that the music is to be accessed at one location at a time, the network-based server 650 ensures that the content license 632 and/or the content can only be accessed at one location (e.g., by deleting one or both of the content license or content from the remote packet-based device 640).

The various embodiments described above and shown in the figures are provided by way of illustration only and should not be construed to limit the invention; various modifications and changes may be made to the present invention. Examples of such ensue by combining aspects taught in the above-cited patent documents (directed to content routing) with the core teaching disclosed by way of the embodiments herein. Moreover, the functions carried out by host servers and data sources can be selectively moved from host to source and/or source to host, depending upon the application. This type of approach is consistent, for example, with a network-distributed content router having portions thereof implemented on both a host server and a content source, with the functions of the content router being carried out at one or both of the host and home locations. As another example, the interface provided to remote users may involve certain client-based functions and other implementations at the remote user's packet-based device, such as where the "remote" user is another home user accessing a packet-based device such as a computer (with software implemented at both locations). These approaches are implemented in connection with various example embodiments of the present invention. Such modifications and changes do not depart from the true spirit and scope of the present invention, including that set forth in the following claims.

What is claimed is:

1. An apparatus comprising:
   at least one processor;
   and at least one memory including computer program code for one or more programs, the at least one memory and the computer program code configured to, with the at least one processor, cause the apparatus to perform at least the following:
   receive requests for protected content access at a remote packet-based terminal,
   associate each request with a content source of a registered user,
   determine to authenticate each request as a function of authentication data and the association,
   determine to control a content router at each associated content source, for selectively configuring content as a function of a protection characteristic of the content,
   wherein selectively configuring the content includes removing protection from the content and re-protecting the content with a new protection type that both facilitates access to the re-protected content at the remote packet-based terminal and mitigates other access to the re-protected content, and
   determine to control the delivery of requested content by sending the selectively configured content to the remote packet-based terminal for each authenticated request.

2. The apparatus of claim 1, wherein the apparatus is further caused to associate each request with the registered user's packet-based content storage arrangement.

3. The apparatus of claim 1, wherein the apparatus is further caused to
   associate each request with the registered user's content source that includes a network-based cache hosted on behalf of the registered user, and
   determine to control the network-based cache for sending the content to a remote packet based terminal.

4. The apparatus of claim 1, wherein the apparatus is further caused to facilitate access to content routed to the remote packet-based terminal by controlling the transfer of protection data to the remote packet-based terminal, the protection data including information that can be used by the remote packet-based terminal to make the content accessible.

5. The apparatus of claim 1, wherein selectively configuring the content includes removing protection from the content.

6. A method comprising:
   determining to facilitate access to at least one interface configured to allow access to at least one service, the at least one service configured to perform at least the following:
   receiving, via a network, requests for protected content access at a remote packet-based terminal;
   associating each request with a registered user's content source; and
   determining to authenticate each request as a function of authentication data and the association,
   wherein for each authenticated request, the requested content is selectively configured as a function of a protection characteristic of the content and the selectively configured content is transferred, via the network, from the registered user's content source to the remote packet-based terminal, and
   wherein the selectively configured content includes removing protection from the content and re-protecting the content with a new protection type that both facilitates access to the re-protected content at the remote packet-based terminal and mitigates other access to the re-protected content.

7. The method of claim 6, wherein the transfer of the selectively configured content includes controlling the transfer of protected content, further including controlling the transfer of protection data to the remote packet-based terminal, the protection data including information that can be used by the remote packet-based terminal to make the requested content accessible.

8. The method of claim 6, wherein selectively configuring the requested content as a function of a protection characteristic of the content includes at least one of
   processing the requested content according to a preconfigured protected format,
   processing the requested content according to an unprotected format, or
   removing protection from requested content and re-protecting the content with another protection type.

9. A server, comprising:
   at least one processor;
   and at least one memory including computer program code for one or more programs, the at least one memory and the computer program code configured to, with the at least one processor, cause the server to perform at least the following:

determine to receive, via a network, requests for protected content access at a remote packet-based terminal,
associate each request with a content source of a registered user,
determine to authenticate each request as a function of authentication data and the association,
determine to control the delivery of requested content to the remote packet-based terminal for each authenticated request via the network;
determine to control a content router at each associated content source, for selectively configuring content as a function of a protection characteristic of the content,
wherein selectively configuring the content includes removing protection from the content and re-protecting the content with a new protection type that both facilitates access to the re-protected content at the remote packet-based terminal and mitigates other access to the re-protected content, and
determine to send the selectively configured content to the remote packet-based terminal to which routing of the content is requested.

10. The server of claim 9, wherein the server is further caused to associate each request with the registered user's packet-based content storage arrangement.

11. The server of claim 9, wherein the server is further caused to
associate each request with the registered user's content source that includes a network-based cache hosted on behalf of the registered user, and
determine to control the network-based cache for sending the content to a remote packet based terminal.

12. The server of claim 9, wherein the server is further caused to facilitate access to content routed to the remote packet-based terminal by controlling the transfer of protection data to the remote packet-based terminal, the protection data including information that can be used by the remote packet-based terminal to make the content accessible.

13. The server of claim 9, wherein selectively configuring the content includes removing protection from the content.

* * * * *